(12) United States Patent
Korpela et al.

(10) Patent No.: US 12,175,728 B2
(45) Date of Patent: Dec. 24, 2024

(54) LABELING SYSTEM, ACTIVITY RECOGNITION SYSTEM, AND TEACHING MATERIAL GENERATING SYSTEM

(71) Applicant: Hitachi, Ltd., Tokyo (JP)

(72) Inventors: Joseph Korpela, Tokyo (JP); Takayuki Akiyama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 348 days.

(21) Appl. No.: 17/878,126

(22) Filed: Aug. 1, 2022

(65) Prior Publication Data

US 2023/0064163 A1    Mar. 2, 2023

(30) Foreign Application Priority Data

Aug. 24, 2021 (JP) ................. 2021-136520

(51) Int. Cl.
*G06V 10/764* (2022.01)
*G06N 20/00* (2019.01)
*G06V 40/20* (2022.01)

(52) U.S. Cl.
CPC .......... *G06V 10/764* (2022.01); *G06N 20/00* (2019.01); *G06V 40/20* (2022.01)

(58) Field of Classification Search
CPC .... G06V 10/764; G06V 40/20; G06V 10/774; G06N 20/00; G06N 7/01
See application file for complete search history.

(56) References Cited

U.S. PATENT DOCUMENTS

| | | |
|---|---|---|
| 2007/0133664 A1 | 6/2007 | Durand et al. |
| 2017/0103264 A1* | 4/2017 | Javan Roshtkhari .. G06V 20/49 |
| 2021/0390492 A1* | 12/2021 | Dhamija ................ G06N 20/00 |

OTHER PUBLICATIONS

Hu, Ninghang, Gwenn Englebienne, Zhongyu Lou, and Ben Kröse. "A hierarchical representation for human activity recognition with noisy labels." In 2015 IEEE/RSJ International Conference on Intelligent Robots and Systems (IROS), pp. 2517-2522. IEEE, 2015. (Year: 2015).*

(Continued)

*Primary Examiner* — Edward F Urban
*Assistant Examiner* — Wassim Mahrouka
(74) *Attorney, Agent, or Firm* — MATTINGLY & MALUR, PC

(57) ABSTRACT

A label is attached to data corresponding to an activity included in time series data. A labeling system includes a processor and a machine learning model from which, in response to an input of time series data, a high-level label indicating a high-level activity included in the time series data and low-level labels indicating a plurality of low-level activities included in the high-level activity are outputted. The processor is configured to output a high-level label and a low-level label by using the machine learning model and cause the high-level label and the low-level label to be displayed, accept an input regarding a high-level label included in the time series data, train the machine learning model assuming that a high-level activity corresponding to the accepted high-level label is included in the time series data, and output a high-level label and a low-level label by using the trained machine learning model.

12 Claims, 25 Drawing Sheets

(56) References Cited

OTHER PUBLICATIONS

Hu, Ninghang, Gwenn Englebienne, and Ben Kröse. "A two-layered approach to recognize high-level human activities." In The 23rd IEEE International Symposium on Robot and Human Interactive Communication, pp. 243-248. IEEE, 2014. (Year: 2014).*

Christine F. Martindale et al., "Smart Annotation of Cyclic Data Using Hierarchical Hidden Markov Models", Sensors, vol. 17, No. 10, 2017, 2328.

* cited by examiner

FIG. 6

| LOW-LEVEL LABEL | PARENT HIGH-LEVEL LABEL | START TIME | FINISH TIME | LABEL CLASS | VERIFIED |
|---|---|---|---|---|---|
| $LL_1$ | $HL_1$ | $LS_1$ | $LE_1$ | $LC_1$ | $LV_1$ |
| $LL_2$ | $HL_1$ | $LS_2$ | $LE_2$ | ... | $LV_2$ |
| ... | ... | ... | ... | $LC_K$ | ... |
| $LL_{N-1}$ | ... | $LS_{N-1}$ | $LE_{N-1}$ | ... | $LV_{N-1}$ |
| $LL_N$ | $HL_M$ | $LS_N$ | $LE_N$ | $LC_1$ | $LV_N$ |

FIG. 7

| HIGH-LEVEL LABEL | START TIME | FINISH TIME | LABEL CLASS | VERIFIED |
|---|---|---|---|---|
| $HL_1$ | $HS_1$ | $HE_1$ | $HC_1$ | $HV_1$ |
| $HL_2$ | $HS_2$ | $HE_2$ | ... | $HV_2$ |
| $HL_3$ | $HS_3$ | $HE_3$ | $HC_J$ | $HV_3$ |
| ... | ... | ... | ... | ... |
| $HL_M$ | $HS_M$ | $HE_M$ | $HC_1$ | $HV_M$ |

```
INPUT HIGH-LEVEL LABEL H = {HL_1, HL_2, ..., HL_M},
LOW-LEVEL LABEL L = {LL_1, LL_2, ..., LL_N}, AND            ~1301
LOW-LEVEL CLASS PROBABILITY P = {P_1, P_2, ..., P_H}
```

SPECIFY L = {l∈L | VERIFIED = True}    ~1302

PREDICT LOW-LEVEL LABEL N FOR UNLABELED TIME SECTION
BY INPUTTING P AND USING SEQUENTIAL MODEL
CORRESPONDING TO LABEL CLASS    ~1303
FOR EACH HIGH-LEVEL LABEL h OF H, AND
SET VERIFIED OF PREDICTED LABEL OF N TO False

SET L = L∪N    ~1304

OUTPUT L    ~1305

FIG. 20

| LOW-LEVEL LABEL | IMPORTANCE |
|---|---|
| $LL_1$ | $LI_1$ |
| $LL_2$ | $LI_2$ |
| ... | ... |
| $LL_{N-1}$ | $LI_{N-1}$ |
| $LL_N$ | $LI_N$ |

FIG. 23

| TIME STAMP | ERROR DETECTION PROBABILITY |
|---|---|
| $T_1$ | $PE_1$ |
| $T_2$ | $PE_2$ |
| ... | ... |
| $T_H$ | $PE_H$ |

LABELING SYSTEM, ACTIVITY RECOGNITION SYSTEM, AND TEACHING MATERIAL GENERATING SYSTEM

CROSS-REFERENCE TO RELATED APPLICATION

The present application claims priority from Japanese application JP2021-136520, filed on Aug. 24, 2021, the contents of which is hereby incorporated by reference into this application.

BACKGROUND OF THE INVENTION

1. Field of the Invention

The present invention relates to a technology of attaching a label to data corresponding to an activity included in time-series data.

2. Description of the Related Art

Activity recognition based on time series data is an important study topic which is applicable to a large variety of fields. In recent years, a machine learning technology such as deep learning has been rapidly improved, so that applicability of activity recognition to the industrial and commercial environments has been newly provided.

One of significant problems that arise when a machine learning model is developed for activity recognition, is a necessity of labeling a large amount of training data that is necessary to construct a machine learning model.

Regarding this problem, US Patent Application Publication No. 2007-133664 describes a method of reducing an amount of to-be-labeled training data by positively selecting a specific unlabeled data sample on the basis of a model performance improvement that is desired when a given unlabeled data sample is labeled.

However, in order to improve the labeling efficiency, this method depends on reduction of an amount of training data to be processed. A case where every unlabeled piece of time series data being processed is reconsidered, and then, is labeled, is not addressed by this method.

Meanwhile, a non-patent literature (Martindale, Christine F and Hoenig, Florian and Strohrmann, Christina and Eskofier, Bjoern M, "Smart annotation of cyclic data using hierarchical hidden Markov models", Sensors, Multidisciplinary Digital Publishing Institute, 2017, Vol. 17, No. 10, P. 2328) discloses a method for improving the efficiency in a case where every unlabeled piece of data is processed. This method provides a performance improvement obtained as a result of automatic labeling of each activity repeated in a cycle, and is applicable only to a case of counting a simple and cyclic activity (e.g. repetition of walking or running).

SUMMARY OF THE INVENTION

A process of labeling time series data in order to use the time series data as training data for a machine learning model, may require a high cost. Improvement in the efficiency of this process has been demanded.

US Patent Application Publication No. 2007-133664 cannot address a case where every unlabeled piece of data including a rare event needs to be labeled, such as a case where a model for making a rare event in data recognizable is constructed.

Meanwhile, the non-patent literature ("Smart annotation of cyclic data using hierarchical hidden Markov models") is applicable only to a case of labeling a simple repeated activity such as walking or running. The use case of this literature is restricted.

The present invention has been made in view of the aforementioned circumstances, and an object thereof is to provide a technology of easily and properly labeling data that corresponds to an activity included in time-series data.

To achieve the above object, a labeling system according to one aspect labels activities included in time series. The activities include a low-level activity and a high-level activity formed of a plurality of the low-level activities. The labeling system includes a processor, and a machine learning model from which, in response to an input of time series data, a high-level label which indicates a high-level activity included in the time series data, and low-level labels which indicate a plurality of low-level activities included in the high-level activity are outputted. In the labeling system, the processor outputs a high-level label and a low-level label for a high-level activity and a low-level activity included in target time series data by using the machine learning model, causes an outputted high-level label and an outputted low-level label to be displayed, the outputted high-level label and the outputted low-level label being for a high-level activity and a low-level activity included in target time series data, accepts an input regarding a high-level label included in the time series data, trains the machine learning model on assumption that a high-level activity corresponding to the accepted high-level label is included in the time series data, and outputs a high-level label and a low-level label of a high-level activity and a low-level activity included in target time series data by using the trained machine learning model.

According to the present invention, data that corresponds to an activity included in time series data can be easily and properly labeled.

BRIEF DESCRIPTION OF THE DRAWINGS

FIG. 6 is a configuration diagram of a low-level label dataset according to the first embodiment;

FIG. 7 is a configuration diagram of a high-level label dataset according to the first embodiment;

FIG. 15 is a flowchart for explaining a machine annotation partial reconstruction process according to the second embodiment;

FIG. 20 is a configuration diagram of a low-level label preference dataset according to the third embodiment;

FIG. 23 is a configuration diagram of an error detection probability dataset according to the fourth embodiment;

DESCRIPTION OF THE REFERRED EMBODIMENTS

Embodiments will be described in detail with reference to the drawings. It is to be noted that embodiments which will be explained below do not restrict the invention in the claims. Elements that are explained in the embodiments and any combination thereof are not necessarily required for the solving means of the present invention.

In the following explanation, information may be expressed as "AAA dataset" in some cases. However, information may be expressed by any data structure. That is, in order to indicate that information does not depend on a data structure, "AAA dataset" may be referred to as "AAA information."

Figure 1:
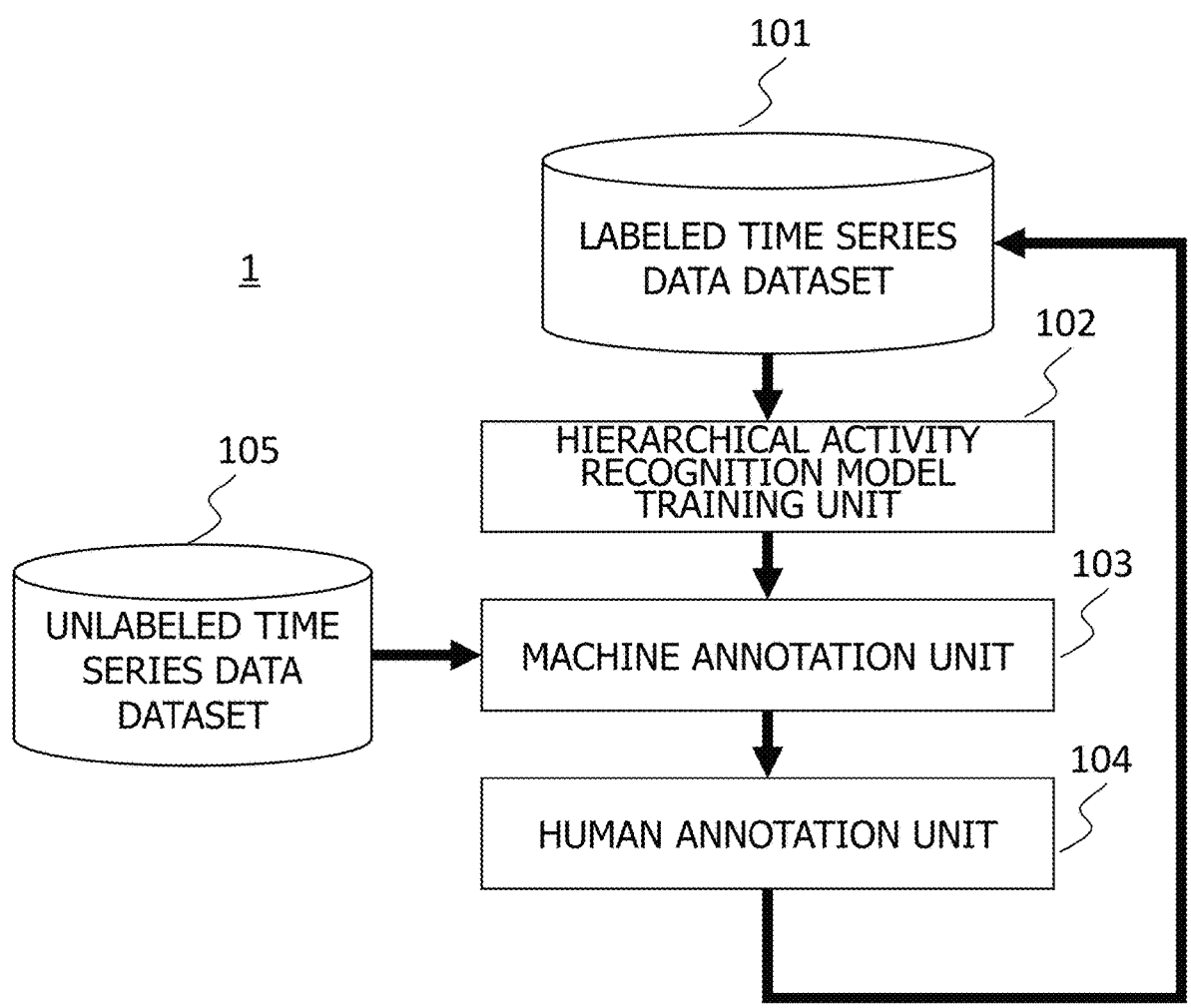
FIG. 1 is a functional configuration diagram of a labeling system according to a first embodiment.

FIG. 1 is a functional configuration diagram of a labeling system according to a first embodiment.

A labeling system 1 stores a labeled time series data dataset 101 and an unlabeled time series data dataset 105, and includes a hierarchical activity recognition model training unit 102, a machine annotation unit 103, and a human annotation unit 104.

The labeled time series data dataset 101 stores labeled time series data. Here, the time series data is video data obtained by photographing a person who is doing an activity, or time series sensor data obtained by a sensor mounted on a person who is doing an activity. For example, the activity is a person's activity (high-level activity) of producing a product (e.g. a washing machine, a refrigerator). The activity (high-level activity) of producing a certain product includes a plurality of lower-level activities (low-level activities) included in the activity of producing the product. For example, an activity of producing a washing machine includes an activity of attaching a panel, an activity of fastening a screw, and an activity of inserting a bolt. Labels that are attached to time series data are high-level labels each indicating a high-level activity in the time series data, and low-level labels each indicating a low-level activity in the time series data. A high-level label is attached to a section (high-level activity section) during which a high-level activity is being done in time series data in the labeled time series data dataset 101. A low-level label is attached to a partial section (sub-segment) during which a low-level activity is being done in the high-level activity section. It is to be noted that labeled time series data may be obtained by attaching a high-level label to one high-level activity in time series data on a certain activity, and by attaching low-level labels to low-level activities included in the high-level activity, for example.

The hierarchical activity recognition model training unit 102 trains a machine learning model (hierarchical activity recognition model) for inferring a high-level label and a low-level label in unlabeled time series data by using labeled time series data.

The unlabeled time series data dataset 105 stores unlabeled time series data which is a target to be labeled by the labeling system 1.

The machine annotation unit 103 infers a high-level label and a low-level label to be attached to unlabeled time series data in the unlabeled time series data dataset 105 by inputting the unlabeled time series data to a machine learning model trained by the hierarchical activity recognition model training unit 102.

The human annotation unit 104 displays, through a user interface (see FIG. 11, for example), time series data as well as a high-level label and a low-level label inferred, by the machine annotation unit 103, to be attached to the time series data. The human annotation unit 104 accepts an input for correcting the inferred labels (high-level label and/or low-level labels) or an input for creating a new label (high-level label and/or low-level label) to the time series data. In this case, on the basis of the input, the human annotation unit 104 converts unlabeled time series data to labeled time series data, and adds the labeled time series data to the labeled time series data dataset 101.

Thereafter, the hierarchical activity recognition model training unit 102 trains the machine learning model by using the labeled time series data dataset 101 such that the machine annotation unit 103 may perform the aforementioned process by using the new trained machine learning model.

Next, a hierarchical activity recognition model training process 300 at the hierarchical activity recognition model training unit 102 will be explained.

Figure 2:
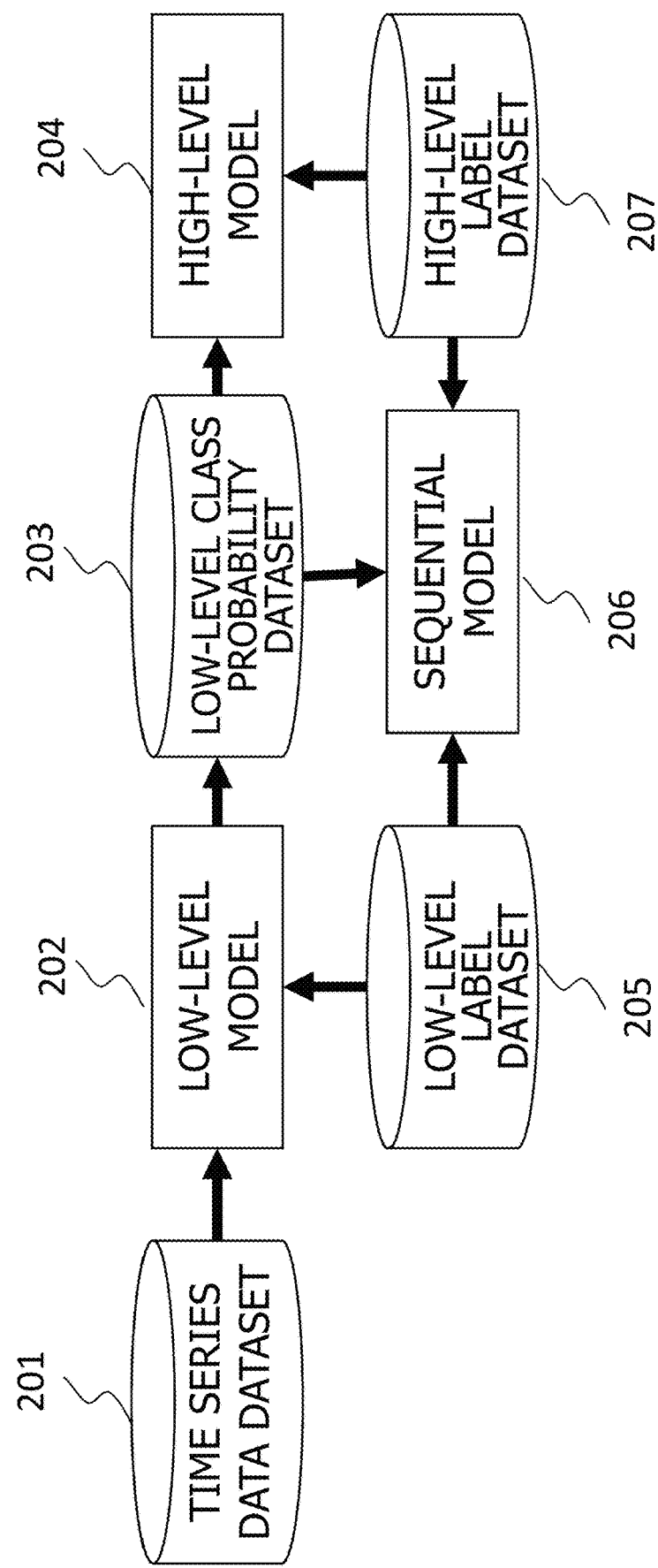
FIG. 2 is a diagram for explaining a process operation of a hierarchical activity recognition model training unit according to the first embodiment.
Figure 3:
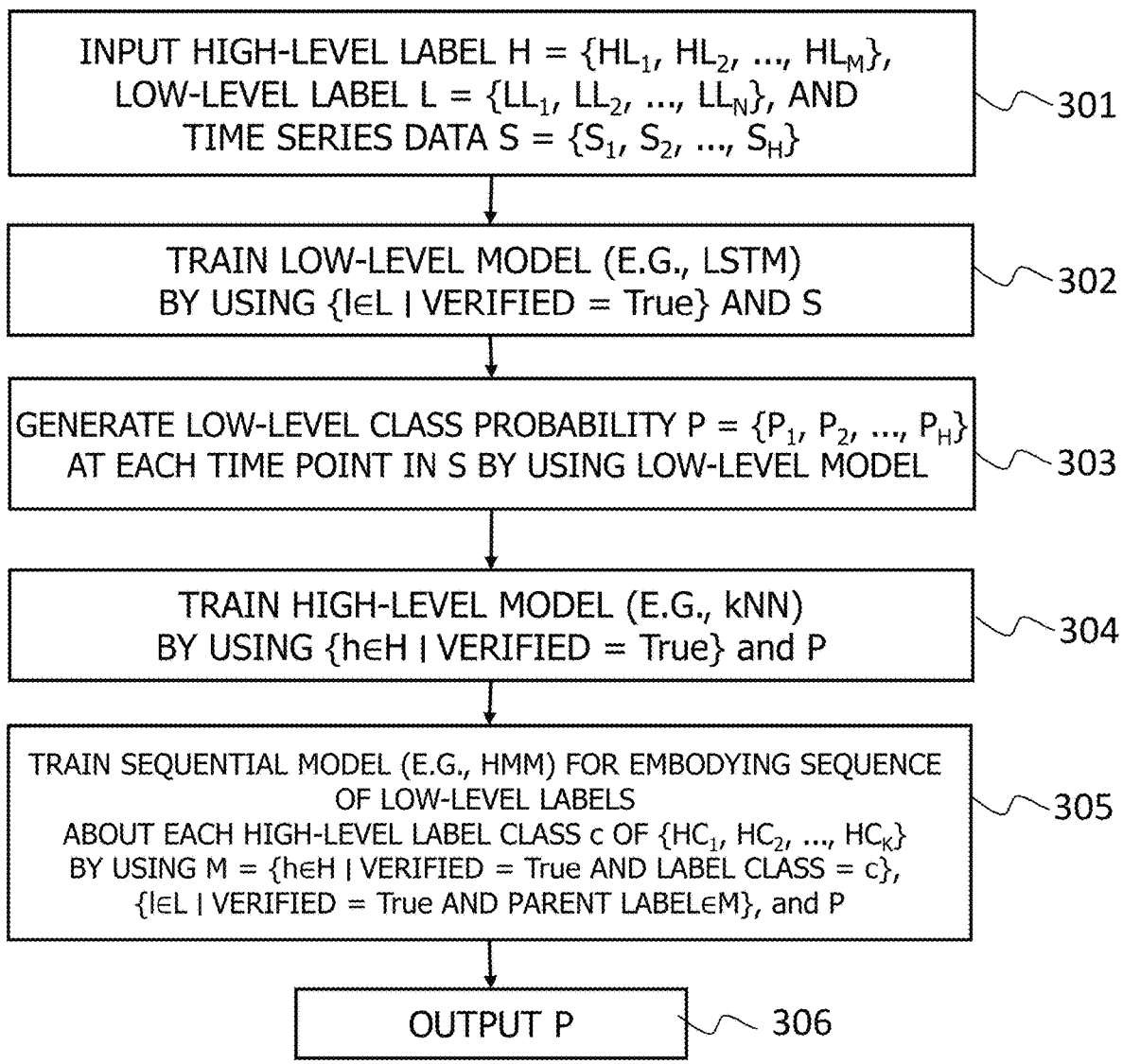
FIG. 3 is a flowchart of a hierarchical activity recognition model training process according to the first embodiment.

FIG. 2 is a diagram for explaining a process operation at a hierarchical activity recognition model training unit according to the first embodiment. FIG. 3 is a flowchart of a hierarchical activity recognition model training process according to the first embodiment.

The hierarchical activity recognition model training unit 102 inputs time series data S in a time series data dataset 201 (see FIG. 4), a low-level label L in a low-level label dataset 205 (see FIG. 6), and a high-level label H in a high-level label dataset 207 (see FIG. 7) (step 301). Here, the labeled time series data dataset 101 and the unlabeled time series data dataset 105 in FIG. 1 are formed of the time series data dataset 201, the low-level label dataset 205, and the high-level label dataset 207.

The hierarchical activity recognition model training unit 102 constructs a low-level model 202, and trains the low-level model 202 by using time series data and a verified low-level label L (an entry having a value of True in verified 606) (step 302). Time series data is inputted to the low-level model 202, and a probability (low-level class probability) that a low-level activity included in the time series data belongs to each of expected low-level activity types (low-level classes) is outputted in time series from the low-level model 202. The low-level model 202 may be a deep learning model (e.g. long short-term memory (LSTM)).

By inputting time series data S to the low-level model 202, the hierarchical activity recognition model training unit 102 generates a low-level class probability P at each time point (time point indicated by a time stamp) in the time series data S (step 303). The generated low-level class probabilities P are stored in the low-level class probability dataset 203.

The hierarchical activity recognition model training unit 102 constructs a high-level model 204, and trains the high-level model 204 by using a low-level class probability and a verified high-level label H (step 304). The low-level class probability is inputted to the high-level model 204, and a high-level label is outputted from the high-level model 204. For example, the high-level model 204 is a K-nearest neighbor (KNN) classifier. It is to be noted that the high-level model 204 may be a deep learning model (e.g. LSTM)), but a simpler model can be used therefor so as to be trained with a less amount of training data.

The hierarchical activity recognition model training unit 102 constructs a sequential model 206, and trains the sequential model 206 for each class (target classes c) of high-level activity types (high-level classes), by using a low-level class probability P, a high-level label H (referred to as M) which has been verified and the high-level class of which is a target class c, and a low-level label L which has been verified and the parent label of which is M (step 305). The sequential models 206 are associated with respective high-level classes. A low-level class probability P is inputted to the sequential model 206, and a low-level label L for a low-level activity of a high-level activity corresponding to the corresponding high-level class is outputted from the sequential model 206. For example, the sequential model 206 is a hidden Markov model (HMM) in which a low-level class probability is defined as an observation amount and the state of a low-level label is hidden.

The hierarchical activity recognition model training unit 102 outputs a low-level class probability P to be used at the machine annotation unit 103 (step 306).

Next, the configuration of the time series data dataset 201 will be explained.

Figure 4:
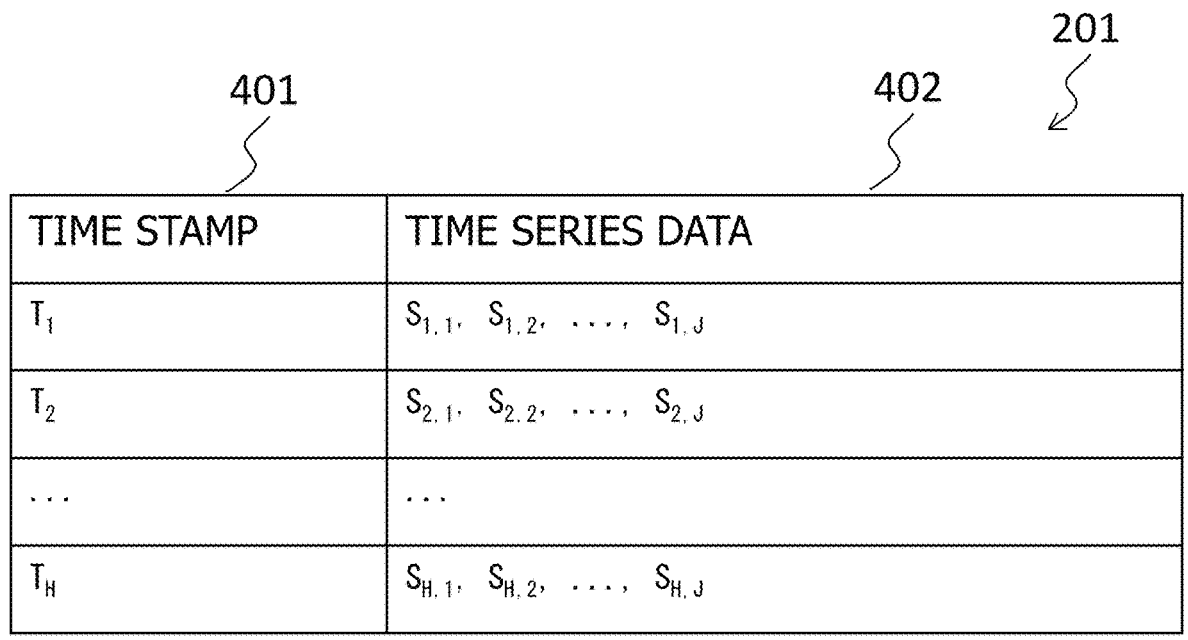
FIG. 4 is a configuration diagram of a time series data dataset according to the first embodiment.

FIG. 4 is a configuration example of a time series data dataset according to the first embodiment.

The time series data dataset 201 stores entries corresponding to respective samples of time series data. An entry in the time series data dataset 201 includes a time stamp 401 column and a time series data 402 column.

A time stamp indicating the time of a sample corresponding to each entry is stored in time stamp 401. For example, in a case where H samples are included in the time series data dataset 201, a time stamp of the first sample is expressed by $T_1$ while a time stamp of the last sample is expressed by $T_H$. Data at the time of a sample corresponding to each entry is stored in time series data 402. Data stored in the time series data 402 may be formed of a plurality of objects or values. For example, in a case where time series data is obtained by a triaxial accelerometer, data in the time series data 402 may be formed of values of three axes. In the example in FIG. 4, the J-th value of the H-th sample is expressed by $S_{H,J}$.

Next, the configuration of the low-level class probability dataset 203 will be explained.

Figure 5:
FIG. 5 is a configuration diagram of a low-level class probability dataset according to the first embodiment.

FIG. 5 is a configuration example of a low-level class probability dataset according to the first embodiment.

The low-level class probability dataset 203 stores entries at respective time points in a prescribed sample. An entry in the low-level class probability dataset 203 includes a time stamp 501 column and a low-level class probability 502 column.

A time stamp indicating the time of a sample corresponding to each entry is stored in time stamp 501. For example, in a case where H samples are included in the low-level class probability dataset 203, a time stamp of the first sample is expressed by $T_1$ while a time stamp of the last sample is expressed by $T_H$. It is to be noted that, in the present embodiment, the times of samples in the low-level class probability dataset 203 are in one-to-one association with the times of samples in the time series data dataset 201, but any other association may be adopted.

Low-level class probabilities (low-level class probabilities:low-level activity probabilities) included in time-series data at a time point indicated by a time stamp corresponding to each entry are stored in the low-level class probability 502. The low-level class probabilities are vectors of probabilities corresponding to each level class. In the low-level class probabilities, one probability value is included for each of K classes that are all targets in the low-level model 202. In FIG. 5, the K-th low-level class probability value of the H-th time stamp is expressed by $P_H$ ($LC_K$).

Next, the configuration of the low-level label dataset 205 will be explained.

FIG. 6 is a configuration diagram of a low-level label dataset according to the first embodiment.

The low-level label dataset 205 stores entries of respective low-level labels to time series data. An entry in the low-level label dataset 205 includes a low-level label 601 column, a parent high-level label 602 column, a start time 603 column, a finish time 604 column, a label class 605 column, and a verified 606 column.

An index indicating a low-level label corresponding to each entry is stored in low-level label 601. In a case where N low-level labels are included in the low-level label dataset 205, an index of the first low-level label is expressed by $LL_1$ while an index of the last low-level label is expressed by $LL_N$. An index (high-level label index) of a parent level label including, in the high-level label dataset 207, the low-level label corresponding to the entry is stored in parent high-level label 602. The number of high-level label indexes stored in parent high-level label 602 in the low-level label dataset 205 is 0 or greater.

A time (start time) when a low-level activity corresponding to a low-level label corresponding to each entry is started in time series data is stored in start time 603. In a case where N low-level labels are included in the low-level label dataset 205, the start time of the first low-level label is expressed by $LS_1$ while the start time of the last low-level label is expressed by $LS_N$. A time (finish time) when a low-level activity corresponding to a low-level label corresponding to each entry is finished in time series data is stored in finish time 604. In a case where N low-level labels are included in the low-level label dataset 205, the finish time of the first low-level label is expressed by $LE_1$ while the finish time of the last low-level label is expressed by $LE_N$. In the present embodiment, it is assumed that two low-level labels do not overlap each other in time series data. In the low-level label dataset 205, two low-level labels LLa and LLb never satisfy start time LSa<finish time LEb and start time LSb<finish time LEa.

A low-level label class indicating a low-level activity of a low-level label corresponding to each entry is stored in label class 605. In the present embodiment, the number of the low-level label classes is K which is equal to the total number of classes that are targets of the low-level model 202. The number of low-level label classes stored in label class 605 in the low-level label dataset 205 is 0 or greater. A Boolean datatype value: True or False which indicates whether or not the correctness of a low-level label corresponding to each entry has been confirmed by a human annotator is stored in verified 606. A value in verified 606 is used to decide a label which becomes training data for training of the hierarchical activity recognition model.

Next, the configuration of the high-level label dataset 207 will be explained.

FIG. 7 is a configuration diagram of a high-level label dataset according to the first embodiment.

The high-level label dataset 207 stores entries of respective high-level labels for time series data. An entry in the high-level label dataset 207 includes a high-level label 701 column, a start time 702 column, a finish time 703 column, a label class 704 column, and a verified 705 column.

An index indicating a high-level label corresponding to each entry is stored in high-level label 701. In a case where M high-level labels are included in the high-level label dataset 207, an index of the first high-level label is expressed by $HL_1$ while an index of the last high-level label is expressed by $HL_M$.

A time (start time) when a high-level activity corresponding to a high-level label corresponding to each entry is started in time series data is stored in start time 702. In a case where M high-level labels are included in the high-level label dataset 207, the start time of the first high-level label is expressed by $HS_1$ while the start time of the last high-level label is expressed by $HS_M$. A time (finish time) when a high-level activity corresponding to a high-level label corresponding to each entry is finished in time series data is stored in finish time 703. In a case where M high-level labels are included in the high-level label dataset 207, the finish time of the first high-level label is expressed by $HE_1$ while the finish time of the last low-level label is expressed by $HE_M$. In the present embodiment, it is assumed that two high-level labels do not overlap with each other in time series data. In the high-level label dataset 207, two high-level labels HLa and HLb never satisfy start time HSa<finish time HEb and start time HSb<finish time HEa.

A high-level label class indicating a high-level activity of a high-level label corresponding to each entry is stored in label class 704. In the present embodiment, the number of high-level label classes is J which is equal to the total number of classes that are targets of the high-level model 204. The number of high-level label classes stored in label class 704 in the high-level label dataset 207 is 0 or greater. A Boolean datatype value which indicates whether or not the correctness of a high-level label corresponding to each entry has been confirmed by a human annotator is stored in verified 705. A value in verified 705 is used to decide a label which becomes training data for training of the hierarchical activity recognition model.

Next, a machine annotation process 900 at the machine annotation unit 103 will be explained.

Figure 8:
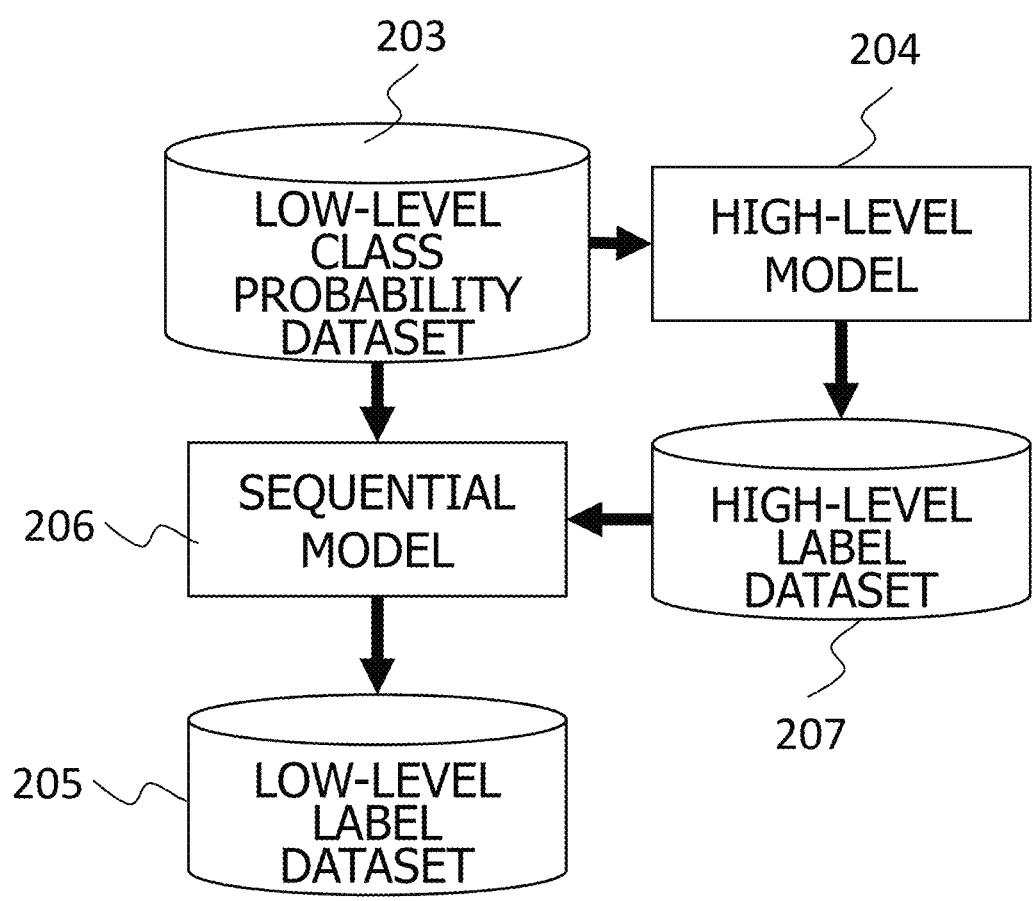
FIG. 8 is a diagram for explaining a process at a machine annotation unit according to the first embodiment.
Figure 9:
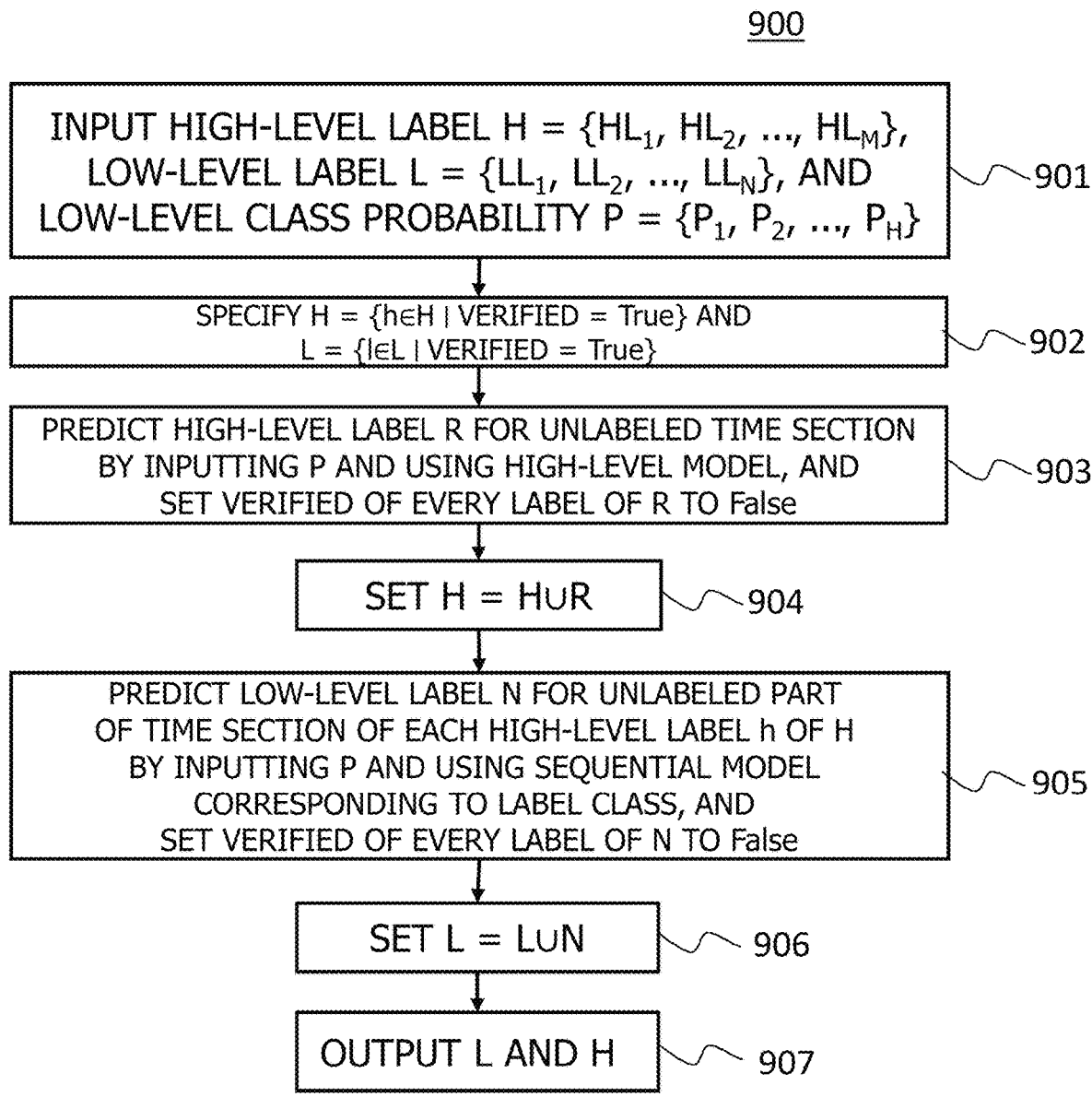
FIG. 9 is a flowchart of a machine annotation process according to the first embodiment.

FIG. 8 is a diagram for explaining a process at a machine annotation unit according to the first embodiment. FIG. 9 is a flowchart of a machine annotation process according to the first embodiment.

The machine annotation unit 103 inputs a low-level label L in the low-level label dataset 205, a high-level label H in the high-level label dataset 207, and a low-level class probability P in the low-level class probability dataset 203 (step 901).

The machine annotation unit 103 deletes unverified labels in the high-level label H and the low-level label L (step 902). Specifically, the machine annotation unit 103 specifies a label, in the high-level label H, having a value of True in verified 705, to be a high-level label H, and specifies a label, in the low-level label L, having a value of True in verified 606, to be a low-level label L.

The machine annotation unit 103 inputs a low-level class probability P obtained from time series data, to the high-level model 204. Accordingly, the machine annotation unit 103 predicts a high-level label R for an unlabeled time section in the time series data, and sets a value of False in verified in each of the predicted high-level labels R (step 903).

The machine annotation unit 103 mixes each high-level label R with the high-level label H, and sets the resultant label as a new high-level label H (step 904).

The machine annotation unit 103 executes the sequential model 206 corresponding to each high-level label h in the high-level label H, on a time section corresponding to the high-level label h in the low-level class probability dataset 203, thereby predicts a sequence of low-level labels N in the time section. Next, the machine annotation unit 103 sets a verified column in the predicted low-level label N, to False (step 905).

The machine annotation unit 103 mixes the low-level label N with the low-level label L, and sets the resultant label as a new low-level label L (step 906). Next, the machine annotation unit 103 passes, as an output, the low-level label L and the high-level label H to the human annotation unit 104 (step 907) such that the low-level label L and the high-level label H are reviewed in a human annotation.

Next, an overall process including a human annotation process that is performed by the human annotation unit 104 will be explained.

Figure 10:
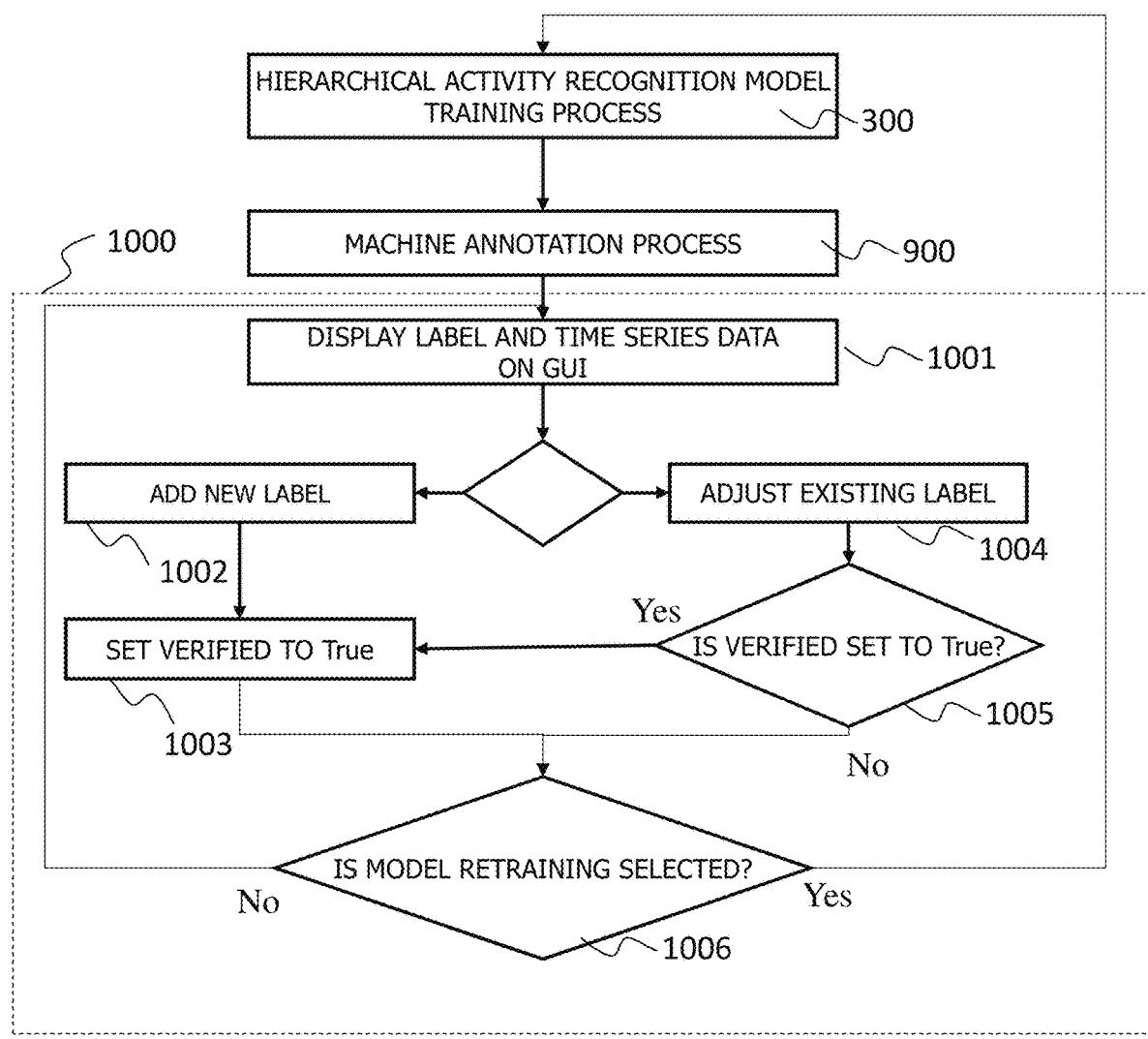
FIG. 10 is a flowchart of an overall process according to the first embodiment.

FIG. 10 is a flowchart of an overall process according to the first embodiment.

In the overall process, the hierarchical activity recognition model training unit 102 executes the hierarchical activity recognition model training process 300 (step 300). Then, the machine annotation unit 103 executes the machine annotation process (step 900). Then, the human annotation unit 104 executes a human annotation process 1000.

Figure 11:
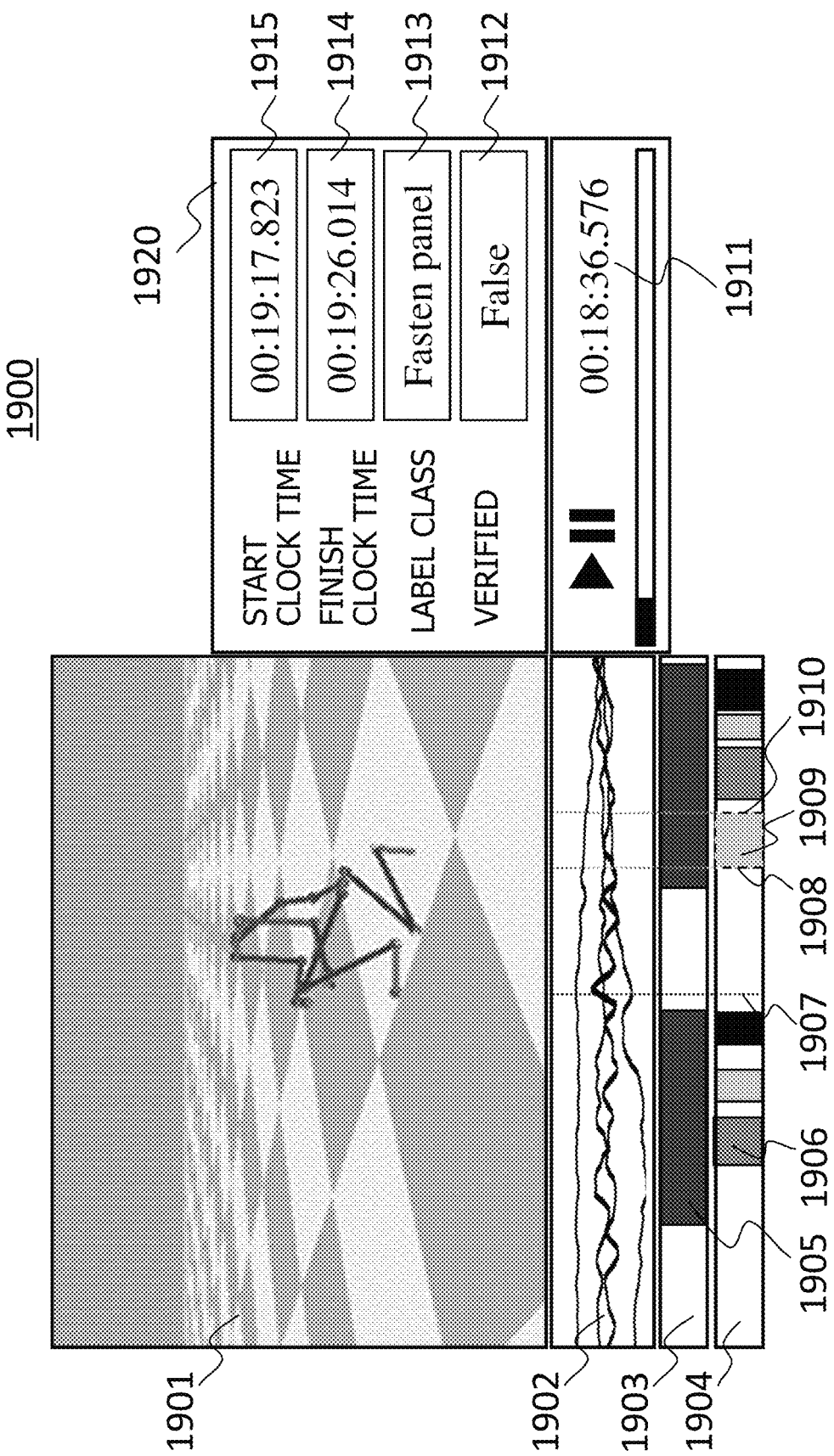
FIG. 11 is a diagram for explaining a user interface according to the first embodiment.

In the human annotation process 1000, the human annotation unit 104 causes time series data and a low-level label and a high-level label outputted by the machine annotation process 900 to be displayed on a user interface (e.g. a graphical user interface (GUI)) such as that illustrated in FIG. 11 (step 1001). Accordingly, a user can review the set labels.

When accepting an addition of a new label (high-level label and/or low-level label) from the user via the user interface, the human annotation unit 104 adds an entry of the label to a corresponding dataset (high-level label dataset 207 when a high-level label is added, or a low-level label dataset 205 when a low-level label is added) (step 1002), and sets True in a verified column of the entry (step 1003). Then, the process proceeds to step 1006. As a result of this process, the new label added by the user and verified is stored in the dataset (the high-level label dataset 207 and/or the low-level label dataset 205).

When accepting an adjustment (change instruction) of an existing label (high-level label and/or low-level label) from the user via the user interface, the human annotation unit 104 makes an adjustment to an adjusted value of an entry of the corresponding label (step 1004). Next, the human annotation unit 104 determines whether or not the user has set the verified value to True (step 1005). When the verified value has been set to True (step 1005: Yes), the process proceeds to step 1003. On the other hand, when the verified value has not been set to True, the process proceeds to step 1006. As a result of this process, a label adjusted by the user and verified is stored in the dataset (high-level label dataset 207 and/or low-level label dataset 205).

Next, the human annotation unit 104 determines whether or not model retraining is selected by the user (step 1006). When determining that model retraining is selected (step 1006: Yes), the human annotation unit 104 gives an instruction to execute the hierarchical activity recognition model training process 300 to the hierarchical activity recognition model training unit 102 in order to perform model retraining. When the human annotation unit 104 has determined that model retraining is not selected (step 1006: No), the process proceeds to step 1001.

According to the above processes, a label can be properly attached to time series data through a user's simple operation in the human annotation process 1000, such as an addition of a label or adjustment of a label predicted by the machine annotation process 900. In addition, a set label can be used to perform model retraining, so that the label prediction accuracy of the model can be improved.

Next, the user interface will be explained.

FIG. 11 is a diagram for explaining a user interface according to the first embodiment.

A display screen 1900 which serves as the user interface includes a video display region 1901, a time series data display region 1902, a high-level label display region 1903, a low-level label display region 1904, a video information display region 1911, and a label information display setting region 1920. The display screen 1900 displays information on the basis of a low-level label L and a high-level label H outputted from the machine annotation unit 103, the time series data dataset 201, the low-level label dataset 205, and the high-level label dataset 207.

A video of video data on a worker doing a work is displayed in the video display region 1901. This video data is one example of time series data. Time series data (sensor data) on a sensor value obtained by a sensor mounted on a worker doing a work is displayed in the time series data display region 1902. The sensor data is one example of time series data. A high-level label (for example, 1905) indicating a high-level activity included in time series data is displayed in a rectangular shape, for example, in the high-level label display region 1903. At least one low-level label (for example, 1906) indicating a low-level activity included in the high-level activity of the high-level label in the high-level label display region 1903 is displayed in a rectangular shape in the low-level label display region 1904. In the time series data display region 1902, the high-level label display region 1903, and the low-level label display region 1904, a horizontal axis indicates time.

An operation button for video data on a video being displayed in the video display region 1901, and information (e.g. time in a video that is currently displayed) are displayed in the video information display region 1911. In the present embodiment, a time indication bar 1907 indicating a position corresponding to the video time is displayed in the time series data display region 1902, the high-level label display region 1903, and the low-level label display region 1904.

Information about a low-level label that is currently selected in the low-level label display region 1904 is displayed and set in the label information display setting region 1920. In FIG. 11, information about a low-level label 1909 that is currently selected in the low-level label display region 1904 is displayed in the label information display setting region 1920.

The label information display setting region 1920 includes a start time display setting region 1915, a finish time display setting region 1914, a label class display setting region 1913, and a verified display setting region 1912.

The start time of a low-level label that is currently selected is displayed so as to be set in the start time display setting region 1915. In the present embodiment, a start time indication bar 1908 for indicating a start time is displayed in the time series data display region 1902, the high-level label display region 1903, and the low-level label display region 1904. The finish time of a low-level label that is currently selected is displayed so as to be set in the finish time display setting region 1914. In the present embodiment, a finish time indication bar 1910 indicating a finish time is displayed in the time series data display region 1902, the high-level label display region 1903, and the low-level label display region 1904. The label class of a low-level label that is currently selected is displayed so as to be set in the label class display setting region 1913. A value indicating whether a low-level label that is currently selected has been verified is displayed so as to be set in the verified display setting region 1912.

In the present embodiment, a user can perform setting for a low-level label by performing an input (setting) to any one of the setting regions in the label information display setting region 1920. Also, in the present embodiment, when a high-level label is selected in the high-level label display region 1903, a label information display setting region that displays information about the high level-label so as to be set is displayed. The configuration of the label information display setting region for a high-level label is similar to that of the label information display setting region 1920.

Next, a computer 10 constituting the labeling system 1 will be explained.

Figure 12:
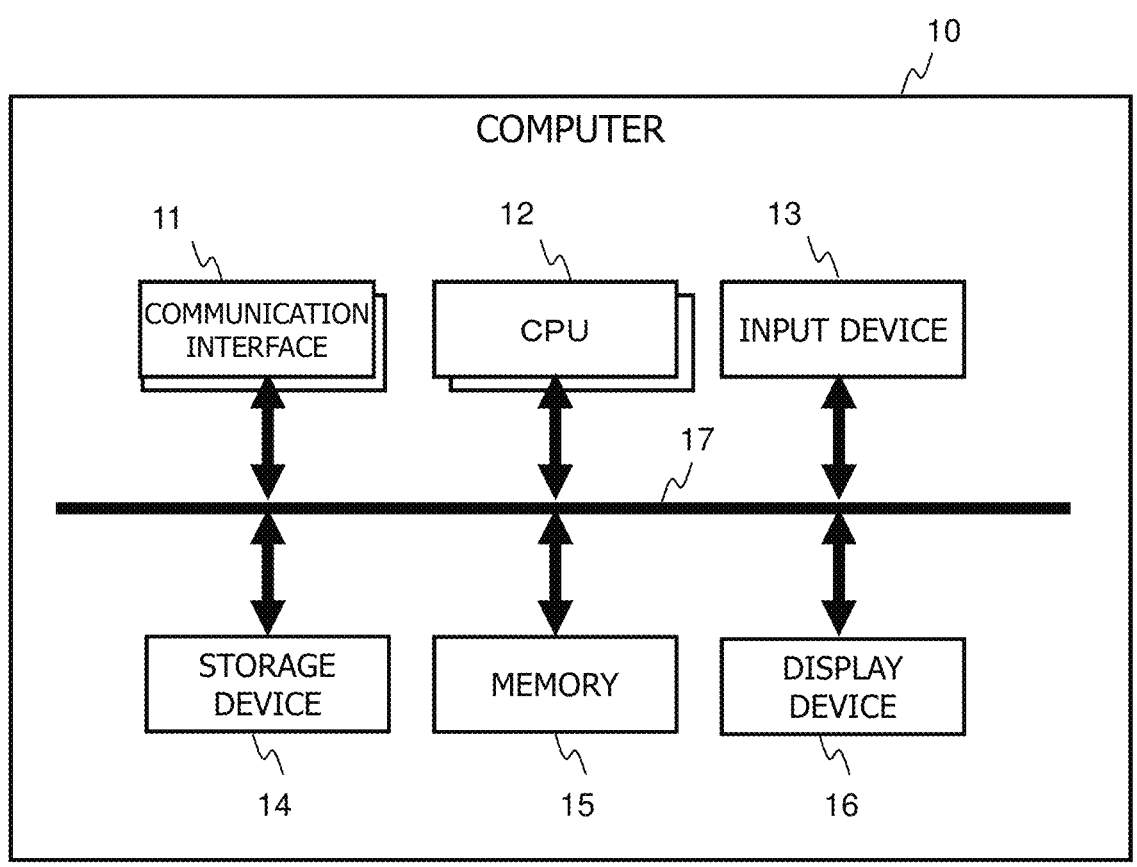
FIG. 12 is a configuration diagram of a computer constituting the labeling system according to the first embodiment.

FIG. 12 is a configuration example of a computer constituting the labeling system according to the first embodiment.

The computer 10 is one example of the information processing apparatus. For example, the computer 10 is formed of a personal computer (PC), a general-purpose server, a tablet computer, or a mobile computer. The computer 10 includes a communication interface (I/F) 11, at least one central processing unit (CPU) 12, an input device 13, a storage device 14, a memory 15, and a display device 16.

The communication I/F 11 is an interface for a wired LAN card or a wireless LAN card, for example. The communication interface 11 communicates with another apparatus over a network (not illustrated).

The CPU 12 is one example of the processor, and executes various types of process in accordance with a program stored in the memory 15 and/or the storage device 14.

The memory 15 is a random access memory (RAM), for example. The memory 15 stores necessary information such as a program to be executed at the CPU 12.

The storage device 14 is a hard disk or a flash memory, for example. The storage device 14 stores a program to be executed by the CPU 12, and data to be used by the CPU 12, for example. In the present embodiment, the storage device 14 stores programs for implementing the hierarchical activity recognition model training unit 102, the machine annotation unit 103, and the human annotation unit 104. Further, the storage device 14 stores the time series data dataset 201, the low-level class probability dataset 203, the low-level label dataset 205, the high-level label dataset 207, etc.

The input device 13 is a mouse or a keyboard, for example. The input device 13 accepts an information input from a user. The display device 16 is a display, for example. The display device 16 outputs display of a user interface including various types of information.

It is to be noted that the labeling system 1 may be formed of the computer 10 and a computer (user computer: information processing apparatus) that is used by a user and is connected to the computer 10 over a network. In this case, assignment of processes to be executed by the computer 10 and the user computer can be optionally decided. For example, the processes assigned to the input device 13 and the display device 16 may be executed by the user computer side. It is to be noted that a system according to any one of other embodiments which will be explained later can also be formed of the computer 10, or the computer 10 and a user computer connected to the computer 10 over a network.

Next, a labeling system according to a second embodiment will be explained. It is to be noted that a structure similar to that in the labeling system according to the first embodiment is denoted by the same reference numeral.

In the labeling system 1 according to the first embodiment, in a case where a label addition or label change is made in the human annotation process 1000, the hierarchical activity recognition model training process 300 is executed again, and then, the machine annotation process 900 is executed. In contrast, in a labeling system 1A according to the second embodiment, the accuracy of labeling time series data can be improved without execution of the hierarchical activity recognition model training process 300. Accordingly, the labeling accuracy can be promptly improved without execution of the hierarchical activity recognition model training process 300 which relatively takes time.

Figure 13:
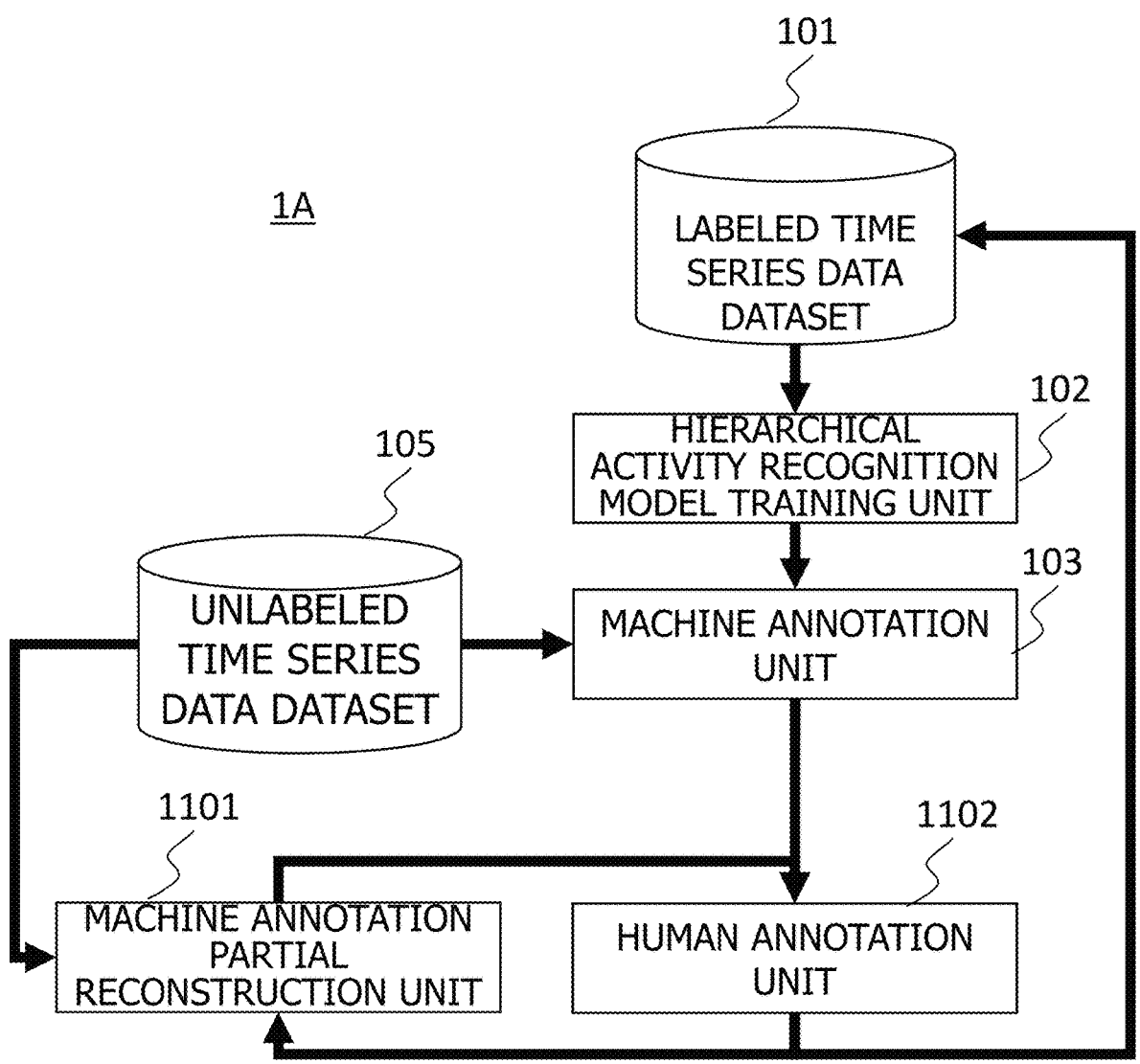
FIG. 13 is a functional configuration diagram of a labeling system according to a second embodiment.

FIG. 13 is a functional configuration diagram of a labeling system according to the second embodiment.

Compared to the labeling system 1, the labeling system 1A includes a human annotation unit 1102 in place of the human annotation unit 104, and additionally includes a machine annotation partial reconstruction unit 1101.

The human annotation unit 1102 is a function unit formed by adding a new process to the human annotation unit 104. Specific processes at the human annotation unit 1102 and the machine annotation partial reconstruction unit 1101 will be explained later.

Next, a machine annotation partial reconstruction process 1300 at the machine annotation partial reconstruction unit 1101 will be explained.

Figure 14:
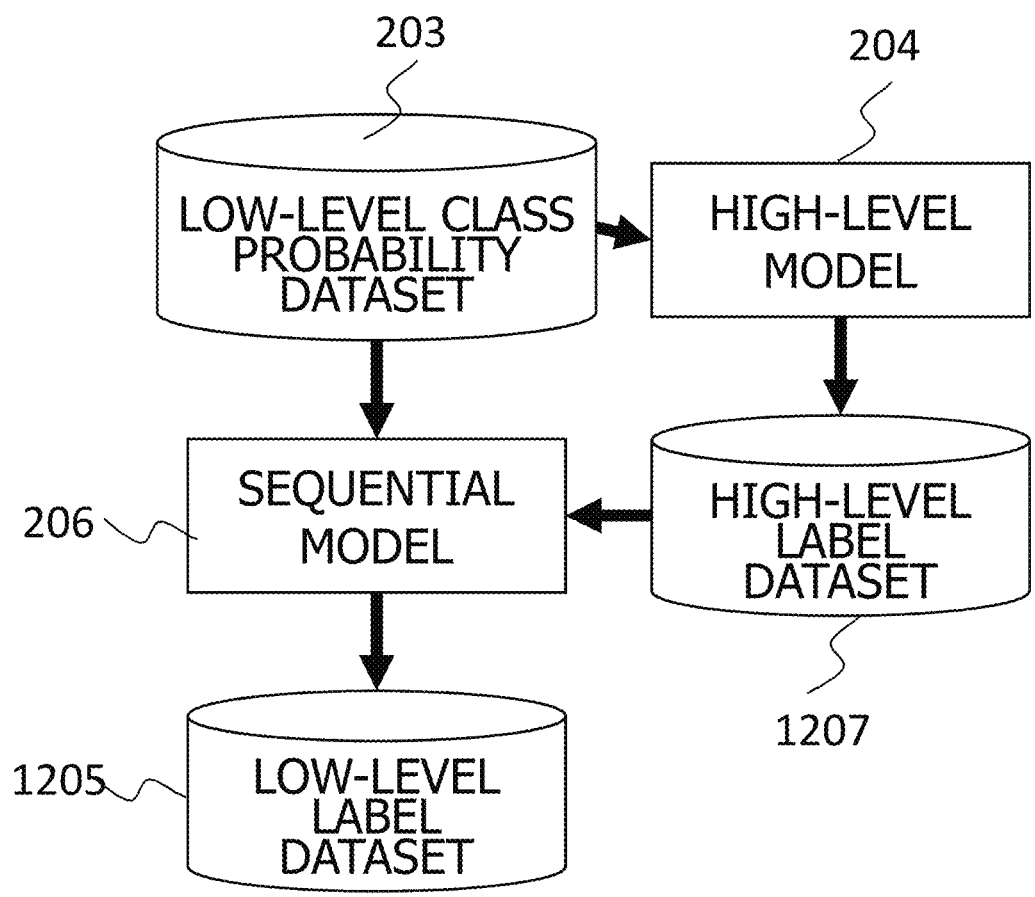
FIG. 14 is a diagram for explaining a process at a machine annotation partial reconstruction unit according to the second embodiment.

FIG. 14 is a diagram for explaining a process at a machine annotation partial reconstruction unit according to the second embodiment. FIG. 15 is a flowchart of a machine annotation partial reconstruction process according to the second embodiment.

The machine annotation partial reconstruction unit 1101 inputs a low-level label L in a low-level label dataset 1205, a high-level label H in a high-level label dataset 1207, a low-level class probability P in the low-level class probability dataset 203 (step 1301). Here, the low-level label dataset 1205 is formed by reflecting, in the low-level label dataset 205, a change made by the process at the human annotation unit 1102. The high-level label dataset 1207 is formed by reflecting, in the high-level label dataset 207, a change made by the process at the human annotation unit 1102.

The machine annotation partial reconstruction unit 1101 deletes an unverified label in the low-level label L (step 1302). Specifically, the machine annotation partial reconstruction unit 1101 specifies a label, in the low-level label L, having a value of True in verified 606 to be a low-level label L. Here, this step is different from step 902 at the machine annotation unit 103 in that a label, in the high-level label H, having a value of False in verified 705 is not deleted.

The machine annotation partial reconstruction unit 1101 executes the sequential model 206 corresponding to each high-level label h in the high-level label H, on a time section corresponding to the high-level label h in the low-level class probability dataset 203, thereby predicts a sequence of low-level labels N in the time section. Then, the machine annotation partial reconstruction unit 1101 sets False in respective verified columns of the predicted low-level labels N (step 1303).

The machine annotation partial reconstruction unit 1101 mixes the low-level labels N with the low-level label L, and sets the resultant label as a new low-level label L (step 1304). Then, the machine annotation partial reconstruction unit 1101 passes the low-level label L as an output to the human annotation unit 1102 (step 1305) such that the low-level label L is reviewed in a human annotation.

Next, an overall process including a human annotation process 1400 at the human annotation unit 1102 will be explained.

Figure 16:
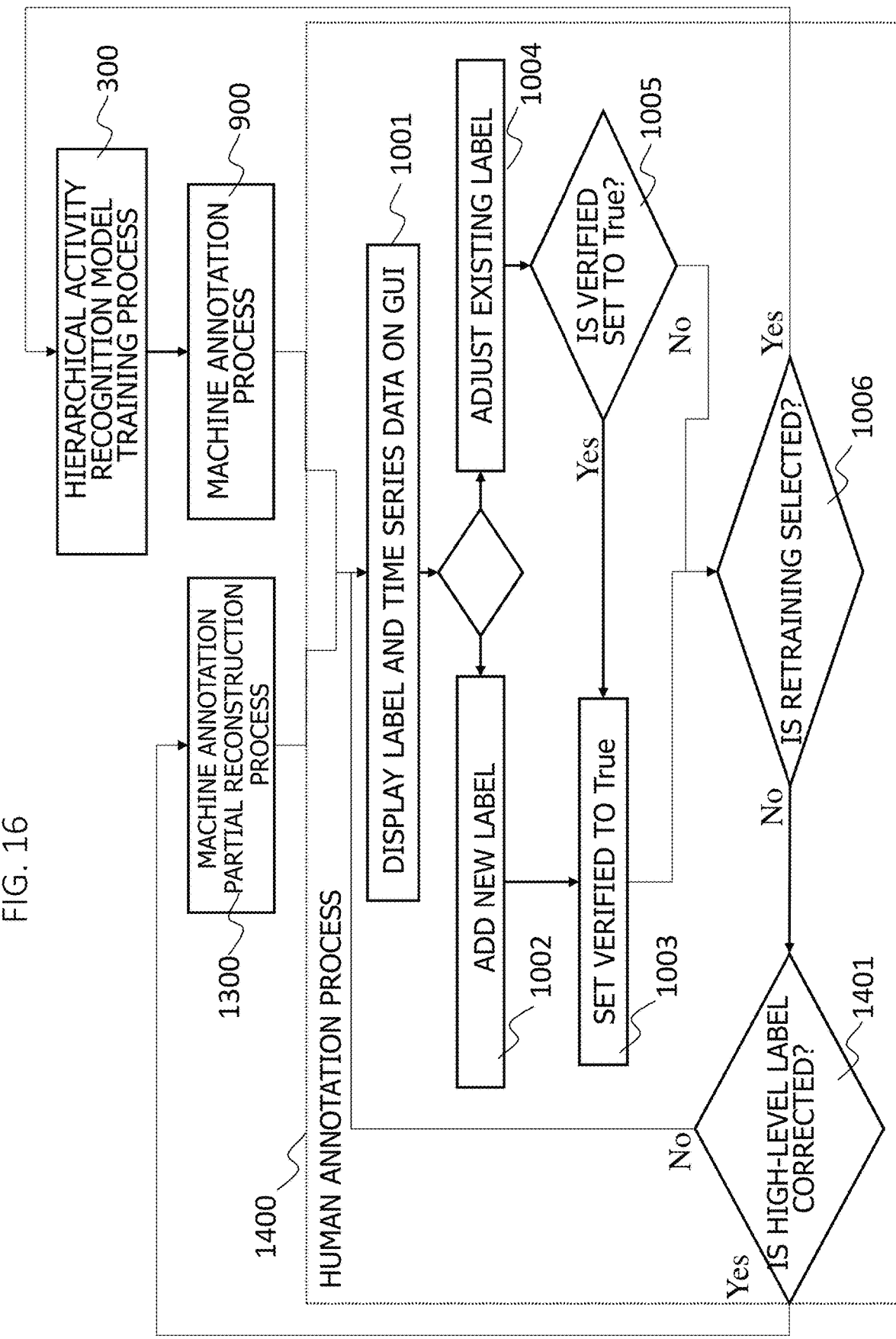
FIG. 16 is a flowchart of an overall process according to the second embodiment.

FIG. 16 is a flowchart of an overall process according to the second embodiment. It is to be noted that a step similar to that in the overall process in FIG. 10 is denoted by the same reference numeral.

In the present embodiment, it is determined at step 1006 that model retraining is not selected (step 1006: No), the human annotation unit 1102 determines whether a high-level label is corrected (step 1401). When the high-level label is not corrected (step 1401: No), the process proceeds to step 1001. On the other hand, when the high-level label is corrected (step S1401: Yes), the process proceeds to step 1300.

At step 1300, the machine annotation partial reconstruction unit 1101 executes the machine annotation partial reconstruction process 1300.

According to the above process, in a case where a high-level label is corrected, the machine annotation partial reconstruction process 1300 can be executed without execution of the hierarchical activity recognition model training process 300 which is for model retraining. Accordingly, the accuracy of labeling time series data can be improved in a short time period without execution of the hierarchical activity recognition model training process 300 which relatively takes time.

Next, a labeling system according to a third embodiment will be explained. It is to be noted that a structure similar to that in the labeling system according to the first embodiment is denoted by the same reference numeral.

Figure 17:
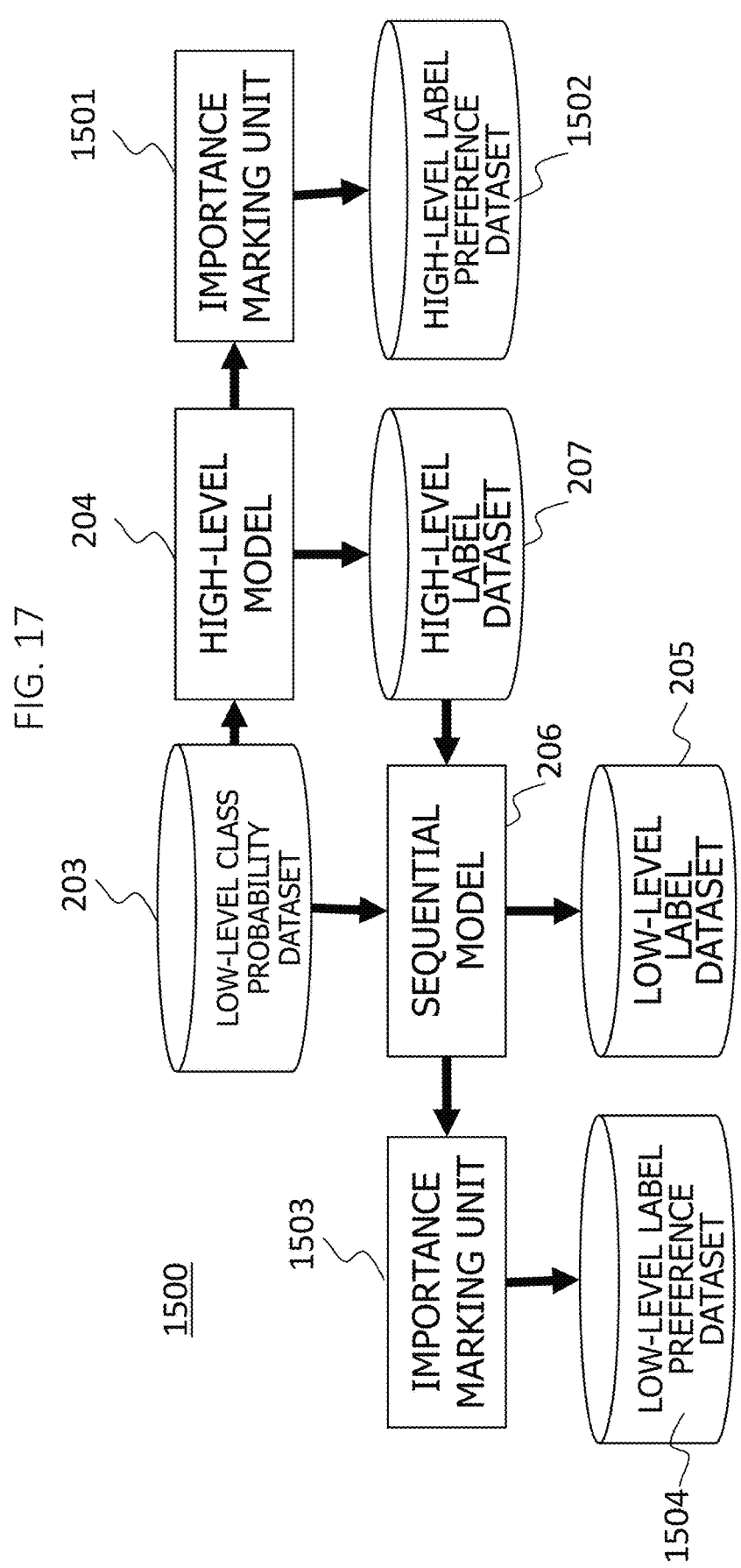
FIG. 17 is a diagram for explaining a machine annotation unit according to a third embodiment.
Figure 18:
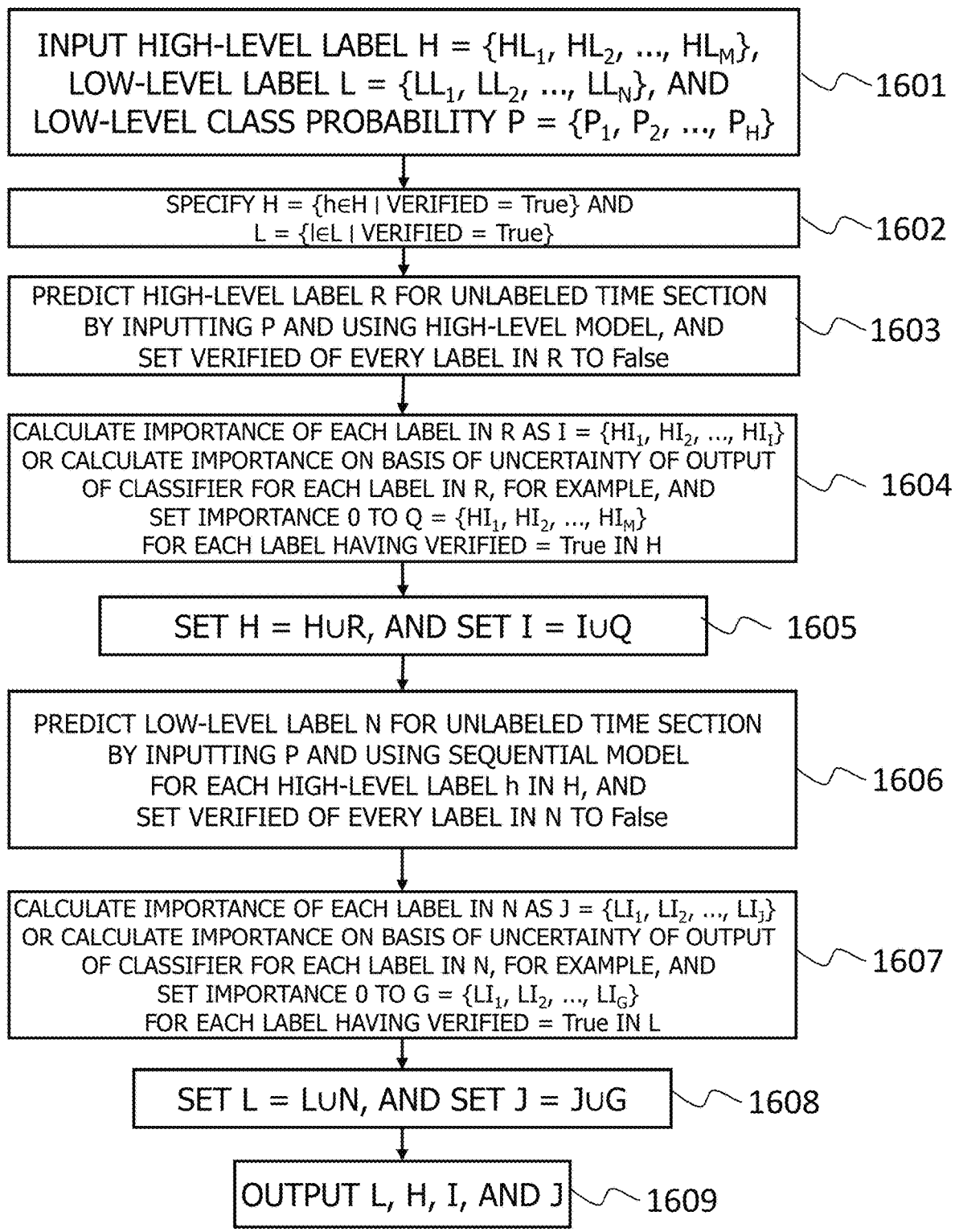
FIG. 18 is a flowchart of a machine annotation process according to the third embodiment.

FIG. 17 is a diagram for explaining a process at a machine annotation unit according to the third embodiment. FIG. 18 is a flowchart of a machine annotation process according to the third embodiment.

The labeling system according to the third embodiment includes a machine annotation unit 1500 in place of the machine annotation unit 103 of the labeling system 1 according to the first embodiment. The machine annotation unit 1500 includes an importance marking unit 1501 and an importance marking unit 1503, in addition to the function of the machine annotation unit 103. The importance marking unit 1501 marks the importance of a high-level label outputted from the high-level model 204, and outputs data on the importance to a high-level label preference dataset 1502. The importance marking unit 1503 marks the importance of a low-level label outputted from the sequential model 206, and outputs data on the importance to a low-level label preference dataset 1504.

In the machine annotation process, the machine annotation unit 1500 inputs a low-level label L in the low-level label dataset 205, a high-level label H in the high-level label dataset 207, and a low-level class probability P in the low-level class probability dataset 203 (step 1601).

The machine annotation unit 1500 deletes unverified labels in the high-level label H and the low-level label L (step 1602). Specifically, the machine annotation unit 1500 specifies a label, in the high-level label H, having a value of True in verified 705, to be a high-level label H, and specifies a label, in the low-level label L, having a value of True in verified 606, to be a low-level label L.

By inputting a low-level class probability P obtained from time series data to the high-level model 204, the machine annotation unit 1500 predicts a high-level label R for an unlabeled time section in the time series data, and sets verified values of all the predicted high-level labels R to False (step 1603).

The importance marking unit 1501 of the machine annotation unit 1500 calculates an importance I of each label in the high-level label R. For example, the importance marking unit 1501 may decide an importance indicating a model certainty by calculating the entropy of the class probability of each class outputted from a high-level model (e.g. a classifier in the model) for a target label. For a target label for which an uncertainty is high, a high entropy is obtained. The importance marking unit 1501 assigns, as an importance Q, an importance of 0 to a verified label in the high-level label dataset 207 (step 1604).

The machine annotation unit 1500 mixes the high-level label R with the high-level label H, and sets the resultant label as a new high-level label H, and mixes the importance Q with the importance I, and sets the resultant importance as a new importance I (step 1605). The importance I is stored in the high-level label preference dataset 1502.

The machine annotation unit 1500 executes the sequential model 206 for each high-level label h in the high-level label H, on an unlabeled time section in the time series. Accordingly, a sequence of low-level labels N in the time section is predicted. Then, the machine annotation unit 1500 sets respective verified columns of all the predicted low-level labels N to False (step 1606).

The importance marking unit 1503 of the machine annotation unit 1500 calculates an importance J of each label in the low-level label N. For example, the importance marking unit 1503 may decide an importance indicating a model certainty by calculating the entropy of the class probability of each class outputted from the sequential model 206 (e.g. a classifier in the model) for a target label. For a target label for which an uncertainty is high, a high entropy is obtained. The importance marking unit 1503 assigns, as an importance G, an importance of 0 to a verified label in the low-level label dataset 205 (step 1607).

The machine annotation unit 1500 mixes the low-level label N with the low-level label L, and sets the resultant level as a new low-level label L, and mixes the importance G with the importance J, and sets the resultant importance as a new importance J (step 1608). The importance J is stored in the low-level label preference dataset 1504.

Then, the machine annotation unit 1500 passes, as an output, the low-level label L, the high-level label H, the importance I, and the importance J to the human annotation unit 104 (step 1609) such that the labels and the importances are reviewed in a human annotation.

Thereafter, the human annotation unit 104 displays the labels and the importances of the labels together through a user interface. Accordingly, a user can specify an importance of each label being displayed, and can easily and properly discern which label requires attention.

Next, a configuration of the high-level label preference dataset 1502 will be explained.

Figure 19:
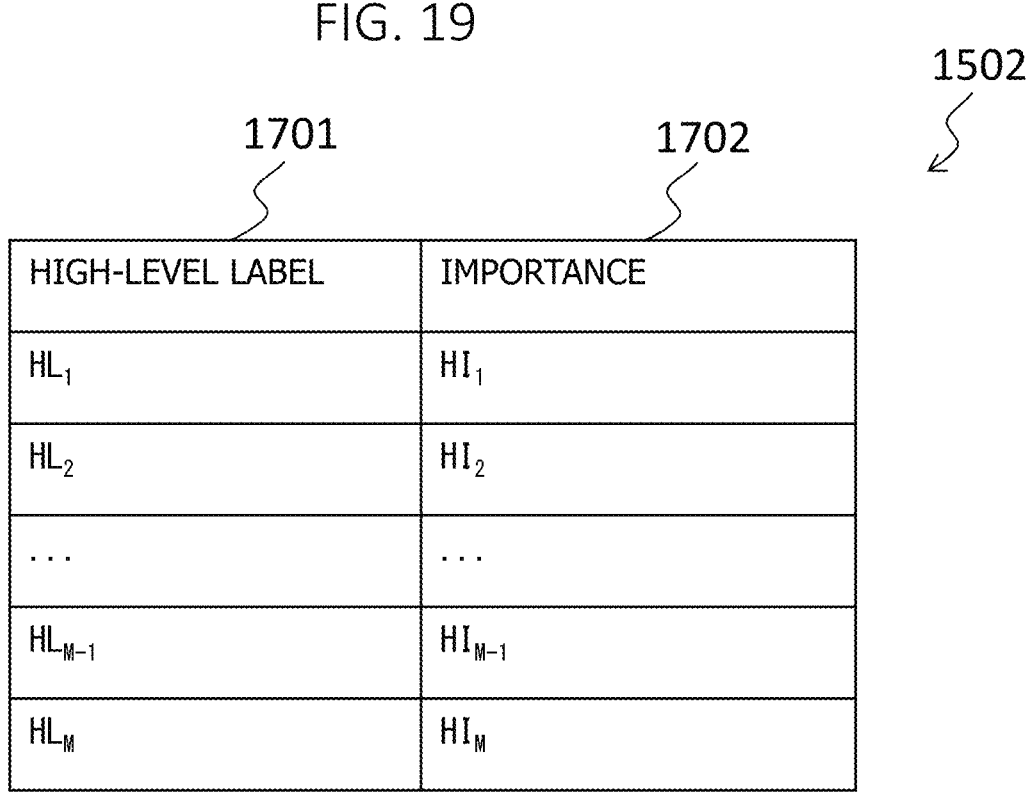
FIG. 19 is a configuration diagram of a high-level label preference dataset according to the third embodiment.

FIG. 19 is a configuration diagram of a high-level label preference dataset according to the third embodiment.

The high-level label preference dataset 1502 stores entries of respective high-level labels in the high-level label dataset 207. An entry in the high-level label preference dataset 1502 includes a high-level label 1701 column and an importance 1702 column.

An index indicating a high-level label corresponding to each entry is stored in high-level label 1701. An importance of a high-level label corresponding to each entry calculated by the importance marking unit 1501 is stored in importance 1702.

Next, the configuration of the low-level label preference dataset 1504 will be explained.

FIG. 20 is a configuration diagram of a low-level label preference dataset according to the third embodiment.

The low-level label preference dataset 1504 stores entries of respective low-level labels in the low-level label dataset 205. An entry in the low-level label preference dataset 1504 includes a low-level label 1801 column and an importance 1802 column.

An index indicating a low-level label corresponding to each entry is stored in low-level label 1801. An importance of a low-level label corresponding to each entry calculated by the importance marking unit 1503 is stored in importance 1802.

Next, an activity recognizing system 2 according to a fourth embodiment will be explained. It is to be noted that a structure similar to that in the labeling system according to the first embodiment is denoted by the same reference numeral.

The activity recognizing system 2 according to the fourth embodiment detects an error in activities included in inputted time series data, by using a machine learning model (the trained low-level model 202, high-level model 204, sequential model 206) trained by the labeling system 1 according to the first embodiment.

Figure 21:
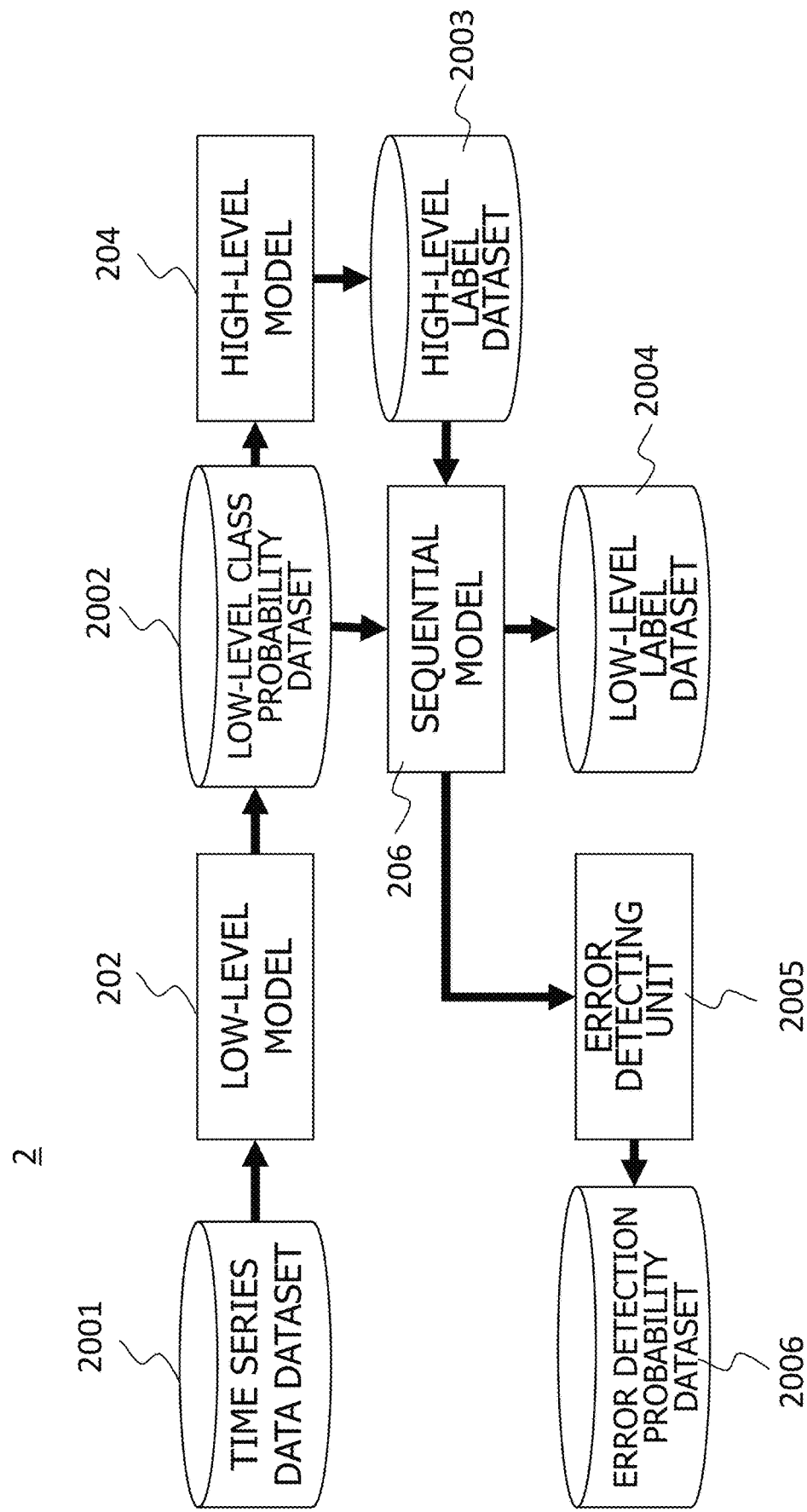
FIG. 21 is a functional configuration diagram of an activity recognition system according to a fourth embodiment.
Figure 22:
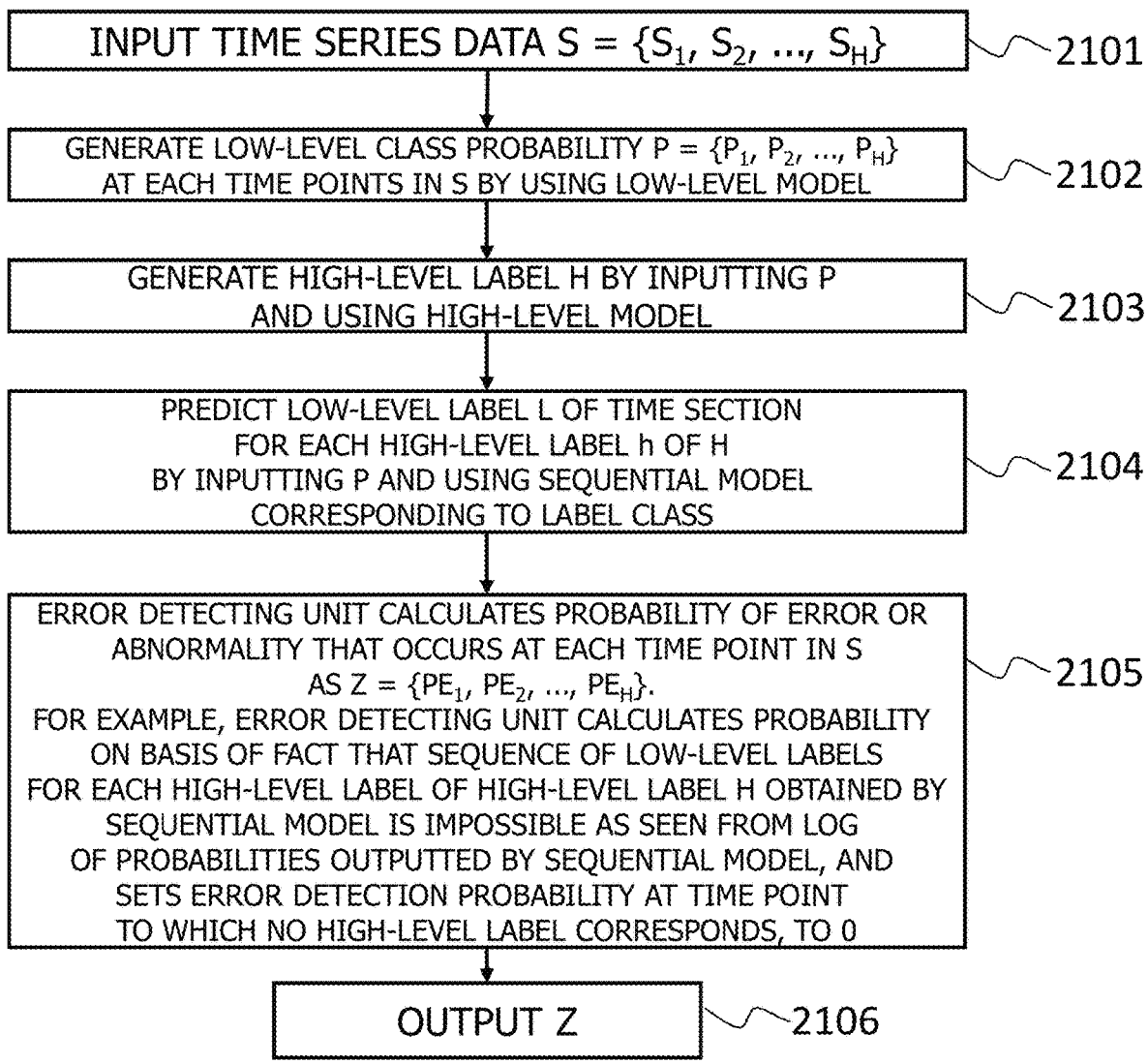
FIG. 22 is a flowchart of an error detection process according to the fourth embodiment.

FIG. 21 is a functional configuration diagram of an activity recognizing system according to the fourth embodiment. FIG. 22 is a flowchart of an error detecting process according to the fourth embodiment.

The activity recognizing system 2 inputs time series data S in a time series data dataset 2001 (step 2101). Here, the time series data dataset 2001 is a dataset of unlabeled time series data that is a target of activity recognition, and includes video data obtained by photographing a person who is doing an activity, or time series sensor data obtained by a sensor mounted on a person who is doing an activity. The time series data may be obtained in real time. The configuration of the time series data dataset 2001 is similar to that of the time series data dataset 201.

By inputting the time series data S to the low-level model 202, the activity recognizing system 2 generates a low-level class probability P at each time point in the time series data S (step 2102). The generated low-level class probabilities P are stored in the low-level class probability dataset 2002. The configuration of the low-level class probability dataset 2002 is similar to that of the low-level class probability dataset 203.

The activity recognizing system 2 predicts (generates) a high-level label H for time series data by inputting the low-level class probability P obtained from the time series data to the high-level model 204, and stores the generated high-level label H in a high-level label dataset 2003 (step 2103). The configuration of the high-level label dataset 2003 is similar to that of the high-level label dataset 207.

The activity recognizing system 2 executes the sequential model 206 corresponding to each high-level label h in the high-level label H, on a time section corresponding to the high-level label h in the low-level class probability dataset 2002, thereby predicts a sequence of low-level labels L in the time section, and then, stores the generated low-level labels L in the low-level label dataset 2004 (step 2104). The configuration of the low-level label dataset 2004 is similar to that of the low-level label dataset 205.

An error detecting unit 2005 of the activity recognizing system 2 calculates the probability of an error or an abnormality that is generated at each time point in the time series data on the basis of outputs from the machine learning model (step 2105). The error detecting unit 2005 may analyze a release probability matrix outputted from a Forward-Backward algorithm that is executed as a part of an HMM used as the sequential model 206. In this case, the release probability matrix gives a probability indicating a vector that is released and observed in the low-level class probability dataset 203 used as an input of the sequential model in the HMM. The error detecting unit 2005 detects an unexpected observation by calculating the entropy of the release probability in each time section. A high entropy indicates a potential error or abnormality in time series data. Accordingly, a high error detection probability at each time point can be guaranteed. The error detecting unit 2005 assigns an error detection probability of 0 to all time points that have not undergone execution of the sequential model because no high-level label corresponds to these time points.

Then, the activity recognizing system 2 outputs an error detection probability Z (step 2106). Thereafter, the activity recognizing system 2 may display information based on the error detection probability through a user interface. Also, the activity recognizing system 2 may determine whether any abnormal activity is included on the basis of the error detection probability, and may display a result of the determination through a user interface.

Next, the configuration of the error detection probability dataset 2006 will be explained.

FIG. 23 is a configuration diagram of an error detection probability dataset according to the fourth embodiment.

Entries at respective time points are stored in the error detection probability dataset 2006. An entry in the error detection probability dataset 2006 includes a time stamp 2201 column and an error detection probability 2202 column.

A time stamp indicating a time corresponding to each entry is stored in time stamp 2201. For example, in a case where H samples are stored in the time series data dataset 201, the time stamp of the first sample is expressed by $T_1$ while the time stamp of the last sample is expressed by $T_H$. It is to be noted that, in the present embodiment, error detection probabilities are generated on one-to-one basis for respective original samples of time series data. However, any other configuration may be adopted. An error detection probability calculated by the error detecting unit 2005 for a time indicated by a time stamp corresponding to each entry in time series data is stored in error detection probability 2202.

Next, a teaching material generating system 3 according to a fifth embodiment will be explained. It is to be noted that a structure similar to that in the labeling system according to the first embodiment is denoted by the same reference numeral.

The teaching material generating system 3 according to the fifth embodiment generates a teaching material from time series data by using a machine learning model (trained low-level model 202, high-level model 204, and sequential model 206) trained by the labeling system 1 according to the first embodiment.

Figure 24:
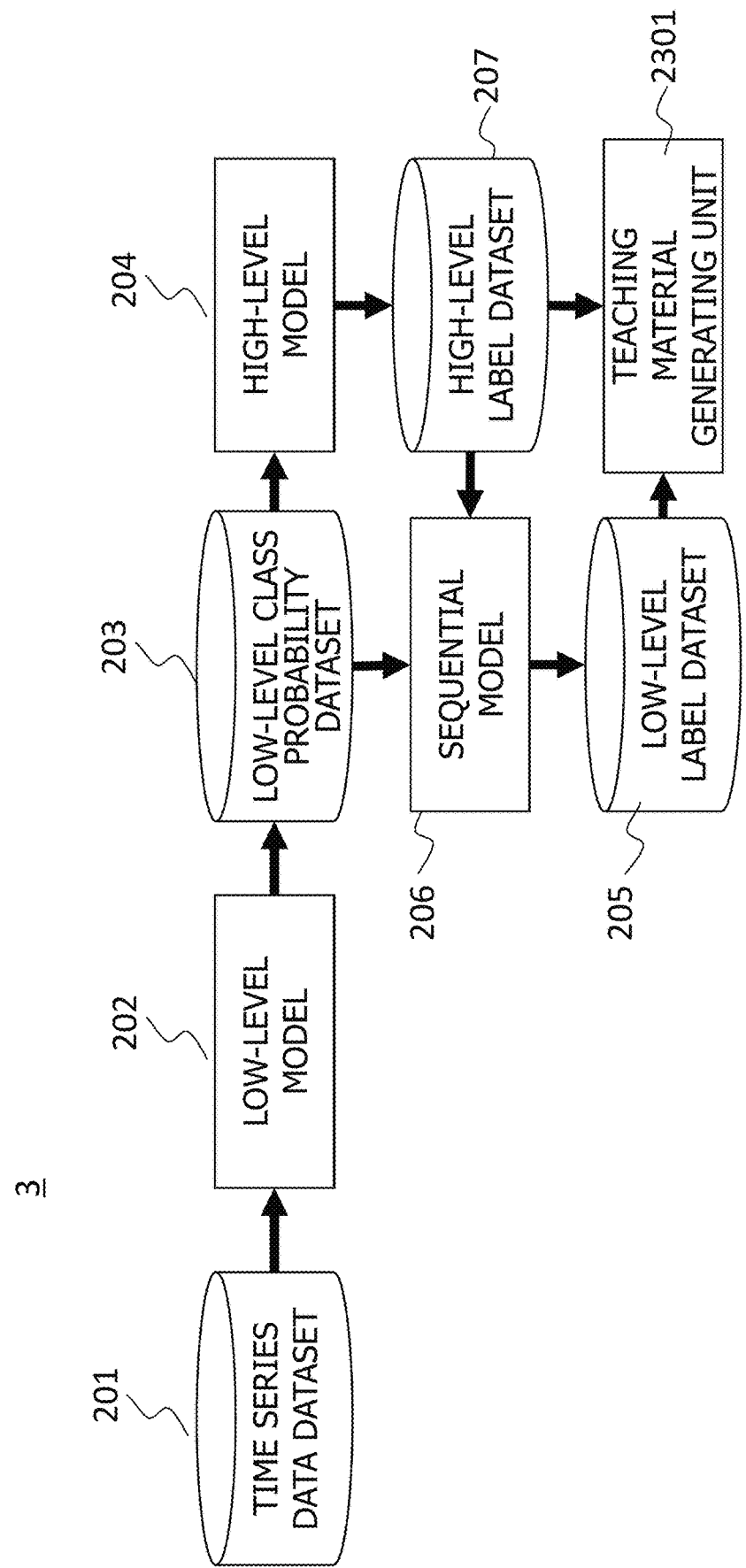
FIG. 24 is a functional configuration diagram of a teaching material generating system according to a fifth embodiment.
Figure 25:
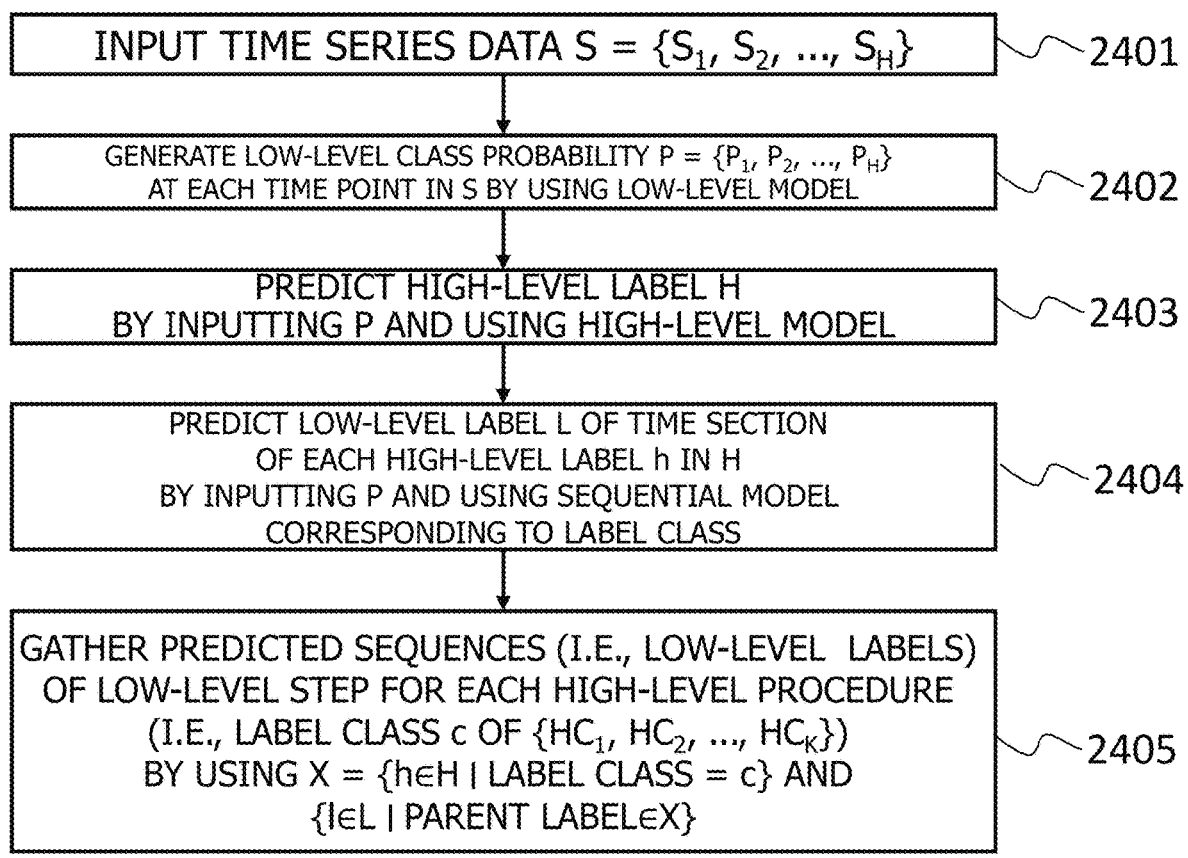
FIG. 25 is a flowchart of a teaching material generating process according to the fifth embodiment.

FIG. 24 is a functional configuration diagram of a teaching material generating system according to the fifth embodiment. FIG. 25 is a flowchart of a teaching material generating process according to the fifth embodiment.

Steps 2401 to 2404 which are executed by the teaching material generating system 3 are similar to steps 2101 to 2104 which are executed by the activity recognizing system 2 according to the fourth embodiment.

A teaching material generating unit 2301 of the teaching material generating system 3 gathers low-level step sequences (i.e. the low-level label dataset 205) predicted for a prescribed procedure (e.g. a label class c of label classes $\{HC_1, HC_2, \ldots, HC_K\}$ in the high-level label dataset 207), by using the machine learning model (step 2405). The teaching material generating unit 2301 may store or output information (teaching material) on a combination of observed steps in the low-level label dataset 205 for the class of each high-level label, for example. Further, to this information, information on the minimum value, the maximum value, the average value, and the standard deviation of the time lengths of steps or procedures (activities), etc. may be added.

According to the teaching material generating system 3, a class of a high-level label and a class of a low-level label belonging to the high-level label can be properly discerned by a user.

It is to be noted that the present invention is not limited to the aforementioned embodiments, and a modification can be made as appropriate within the scope of the gist of the present invention For example, in the aforementioned embodiments, a machine learning model including the low-level model 202, the high-level model 204, and the sequential model 206 is used as the machine learning model from which, in response to an input of time series data, a high-level label and a low-level label are outputted. The present invention is not limited to this configuration. The machine learning model may be formed of one model, or may be formed of any other multiple models.

In addition, the activity recognizing system activity recognizing system 2 according to the fourth embodiment or teaching material generating system 3 according to the fifth embodiment may have a structure (hierarchical activity recognition model training unit 102, etc.) for training the machine learning model according to any one of the first to third embodiments, and may train the machine learning model.

In addition, a portion or the entirety of processing that is performed by the CPU in the aforementioned embodiments, may be performed by a hardware circuit. A program in the aforementioned embodiments may be installed from a program source. The program source may be a program distribution server or a recording medium (e.g. portable recording medium).

What is claimed is:
1. A labeling system for labeling activities that are included in time series data, the activities including a low-level activity and a high-level activity formed of a plurality of the low-level activities, the labeling system comprising:
a processor; and
a machine learning model from which, in response to an input of time series data, a high-level label which indicates a high-level activity included in the time series data, and low-level labels which indicate a plurality of low-level activities included in the high-level activity are outputted, wherein
the processor
  outputs a high-level label and a low-level label for a high-level activity and a low-level activity included in target time series data by using the machine learning model,
  causes an outputted high-level label and an outputted low-level label to be displayed, the outputted high-level label and the outputted low-level label being for a high-level activity and a low-level activity included in target time series data,
  accepts an input regarding a high-level label included in the time series data,
  trains the machine learning model on assumption that a high-level activity corresponding to the accepted high-level label is included in the time series data, and
  outputs a high-level label and a low-level label of a high-level activity and a low-level activity included in target time series data by using the trained machine learning model.

2. The labeling system according to claim 1, wherein
the machine learning model includes
  a low-level model from which, in response to an input of time series data, low-level activity possibilities which are possibilities of a plurality of low-level activities in the time series data are outputted in time series,
  a high-level model from which, in response to a time series input of the low-level activity possibilities, a high-level label indicating a high-level activity included in time series data to the low-level activity possibilities is outputted, and
  a sequential model from which, in response to an input of low-level activity probabilities and a high-level label, low-level labels indicating a plurality of low-level activities included in time series data are outputted, and
the processor
  trains the high-level model on assumption that a high-level activity corresponding to the accepted high-level label is included in the time series data, and
  outputs a high-level label and a low-level label for a high-level activity and a low-level activity included in target time series data by using the trained high-level model.

3. The labeling system according to claim 2, wherein
when accepting an input regarding the high-level label from a user, the processor inputs the accepted high-level label to the sequential model without training the high-level label such that a high-level label and a low-level label for a high-level activity and a low-level activity included in target time series data are outputted.

4. The labeling system according to claim 2, wherein
a plurality of high-level labels and an importance that a high-level activity corresponding to the high-level label included in target time series data are outputted from the high-level model, and
the processor outputs the high-level label and the importance in a recognizable manner to the user.

5. The labeling system according to claim 2, wherein
as the input regarding a high-level label included in time series data from the user, the processor accepts, from the user, a designation of a new high-level label for a high-level activity included in the time series data or an instruction to change the outputted high-level label.

6. The labeling system according to claim 5, wherein
the processor
  accepts, from the user, a designation of a new low-level label for a low-level label activity included in the time series data, or an instruction to change the outputted low-level label, and
  trains the low-level model on assumption that a low-level activity corresponding to the accepted low-level label is included in the time series data.

7. The labeling system according to claim 1, wherein
the labeling system is formed of a single information processing apparatus.

8. The labeling system according to claim 1, wherein
the labeling system is formed of a server and an information processing apparatus that is connected to the server over a network.

9. The labeling system according to claim 1, wherein
the time series data is video data obtained by photographing a human activity or sensor data obtained by a sensor that can be mounted on a person.

10. An activity recognizing system for recognizing activities included in time series data, the activities including a low-level activity and a high-level activity formed of a plurality of the low-level activities, the activity recognizing system comprising:
a processor; and
a machine learning model which has been trained by the labeling system according to claim 1, and from which, in response to an input of time series data, a high-level label indicating a high-level activity included in the time series data and low-level labels indicating a plurality of low-level activities included in the high-level activity are outputted, wherein
the processor
  sequentially accepts an input of time series data which is video data obtained by photographing a human activity or sensor data obtained by a sensor that can be mounted on a person,
  sequentially outputs a high-level label and a low-level label for a high-level activity and a low-level activity included in target time series data by using the machine learning model, and
  sequentially recognizes a human activity on a basis of the sequentially outputted high-level label and low-level label.

11. The activity recognizing system according to claim 10, wherein
the processor determines whether or not the recognized human activity is abnormal.

12. A teaching material generating system for generating a teaching material indicating a relation between a high-level activity and a low-level activity in an activity that includes a low-level activity and a high-level activity formed of a plurality of the low-level activities, the teaching material generating system comprising:
a processor; and
a machine learning model which has been trained by the labeling system according to claim 1, and from which, in response to an input of time series data, a high-level label indicating a high-level activity included in the time series data, and low-level labels indicating a plurality of low-level activities included in the high-level activity are outputted, wherein the processor
- outputs a high-level label and a low-level label for a high-level activity and a low-level activity included in prescribed time series data by using the machine learning model, and
- generates, on a basis of an outputted high-level label and an outputted low-level label for a high-level activity and a low-level activity included in time series data, a teaching material which is an aggregate of information indicating a correspondence between the high-level label and the low-level label.

* * * * *